US010917636B2

(12) United States Patent
Li et al.

(10) Patent No.: US 10,917,636 B2
(45) Date of Patent: Feb. 9, 2021

(54) METHOD AND APPARATUS FOR VIDEO CODING

(71) Applicant: Tencent America LLC, Palo Alto, CA (US)

(72) Inventors: Xiang Li, Saratoga, CA (US); Guichun Li, Milpitas, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/531,958

(22) Filed: Aug. 5, 2019

(65) Prior Publication Data

US 2020/0177873 A1    Jun. 4, 2020

Related U.S. Application Data

(60) Provisional application No. 62/774,828, filed on Dec. 3, 2018.

(51) Int. Cl.
| | |
|---|---|
| *H04N 19/70* | (2014.01) |
| *H04N 19/103* | (2014.01) |
| *H04N 19/119* | (2014.01) |
| *H04N 19/137* | (2014.01) |

(Continued)

(52) U.S. Cl.
CPC ......... *H04N 19/103* (2014.11); *H04N 19/119* (2014.11); *H04N 19/137* (2014.11); *H04N 19/176* (2014.11); *H04N 19/593* (2014.11); *H04N 19/70* (2014.11)

(58) Field of Classification Search
CPC .. H04N 19/103; H04N 19/176; H04N 19/119; H04N 19/137; H04N 19/593; H04N 19/70
See application file for complete search history.

(56) References Cited

U.S. PATENT DOCUMENTS

| | | | |
|---|---|---|---|
| 9,325,990 B2 | 4/2016 | Chen et al. | |
| 9,986,248 B2 * | 5/2018 | Pu | H04N 19/593 |
| 2008/0069240 A1 | 3/2008 | Amon et al. | |

(Continued)

FOREIGN PATENT DOCUMENTS

WO    WO 2017/197126 A1    11/2017

OTHER PUBLICATIONS

High Efficiency Video Coding , Rec. ITU-T H.265v4, Dec. 2016.

(Continued)

*Primary Examiner* — Anner N Holder
(74) *Attorney, Agent, or Firm* — Oblon, McClelland, Maier & Neustadt, L.L.P.

(57) ABSTRACT

Aspects of the disclosure provide methods and apparatuses for video coding. In some examples, an apparatus includes processing circuitry that obtains a first syntax element from a coded video bitstream, the first syntax element being associated with a plurality of modes for identifying and applying motion information to a current block, and a first value of the first syntax element indicating a subset of the plurality of modes for the current block. The processing circuitry further generates a predictor of the current block according to the subset of the plurality of modes indicated by the first value of the first syntax element, and generates reconstructed samples of the current block based on the predictor.

19 Claims, 16 Drawing Sheets

(51) Int. Cl.
*H04N 19/176* (2014.01)
*H04N 19/593* (2014.01)

(56) References Cited

U.S. PATENT DOCUMENTS

| | | | | |
|---|---|---|---|---|
| 2012/0320969 A1* | 12/2012 | Zheng | H04N 19/40 | 375/240.02 |
| 2012/0327999 A1* | 12/2012 | Francois | H04N 19/11 | 375/240.02 |
| 2014/0010282 A1 | 1/2014 | He et al. | | |
| 2014/0092964 A1 | 4/2014 | Ugur et al. | | |
| 2014/0092967 A1* | 4/2014 | Seregin | H04N 19/52 | 375/240.13 |
| 2014/0198841 A1* | 7/2014 | George | H04N 19/513 | 375/240.03 |
| 2014/0254684 A1* | 9/2014 | Lim | H04N 19/103 | 375/240.16 |
| 2016/0360239 A1 | 12/2016 | Kirchhoffer et al. | | |
| 2018/0184083 A1* | 6/2018 | Panusopone | H04N 19/82 | |
| 2018/0205946 A1* | 7/2018 | Zhang | H04N 19/136 | |
| 2019/0020893 A1* | 1/2019 | Sugio | H04N 19/70 | |
| 2019/0222837 A1* | 7/2019 | Lee | H04N 19/44 | |
| 2019/0263990 A1* | 8/2019 | Sugie | C08J 9/0061 | |
| 2019/0320177 A1* | 10/2019 | George | H04N 19/132 | |
| 2019/0379901 A1* | 12/2019 | Chiang | H04N 19/176 | |
| 2020/0120336 A1* | 4/2020 | Racape | H04N 19/176 | |

OTHER PUBLICATIONS

Ru-Ling Liao et al., "CE10: Triangular prediction unit mode (CE10.3.1 and CE10.3.2)", ISO/IEC JTC 1/SC 29/WG 11 JVET-K0144-v2, Jul. 2018.
Seungsoo Jeong et al., "CE4 Ultimate motion vector expression (Test 4.5.4)", ISO/IEC JTC 1/SC 29/WG 11 JVET-L0054, Oct. 2018.
Tangi Poirier et al., "CE10-related: Multiple prediction unit shapes", ISO/IEC JTC 1/SC 29/WG11 JVET-L0208-v1 , Oct. 2018.
Benjamin Bross, et al., "Versatile Video Coding (Draft 3)", ISO/IEC JTC 1/SC 29/WG 11 JVET-L1001-v9, Oct. 2018.
Man-Shu Chiang et al., "CE10.1.1: Multi-hypothesis prediction for improving AMVP mode, skip or merge mode, and intra mode", ISO/IEC JTC 1/SC 29/WG11 JVET-L0100-v3 , Oct. 2018.
International Search Report and Written Opinion dated Feb. 10, 2020 in PCT/US2019/063857.

* cited by examiner

METHOD AND APPARATUS FOR VIDEO CODING

INCORPORATION BY REFERENCE

This present disclosure claims the benefit of priority to U.S. Provisional Application No. 62/774,828, "EFFICIENT MERGE TYPE SIGNALING METHODS" filed on Dec. 3, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry configured to obtain a first syntax element from a coded video bitstream, the first syntax element being associated with a plurality of modes for identifying and applying motion information to a current block, and a first value of the first syntax element indicating a subset of the plurality of modes for the current block. The processing circuitry is further configured to generate a predictor of the current block according to the subset of the plurality of modes indicated by the first value of the first syntax element, and generate reconstructed samples of the current block based on the predictor.

In some embodiments, the plurality of modes includes a regular merge mode corresponding to deriving motion information for the current block according to a selected motion information candidate from a list of motion information candidates; a sub-block merge prediction mode corresponding to splitting the current block into plural rectangular sub-blocks and deriving respective motion information for the plural rectangular sub-blocks; and a triangle prediction unit mode corresponding to splitting the current block into triangular sub-partitions and deriving respective motion information for the triangular sub-partitions.

In some embodiments, the plurality of modes further includes a merge with motion vector difference mode corresponding to deriving the motion information for the current block according to the selected motion information candidate from the list of motion information candidates and motion vector difference information.

In some embodiments, the plurality of modes further includes a multi-hypothesis prediction for intra mode corresponding to generating a final predictor for the current block by combining an intra predictor and an inter predictor.

In some embodiments, the first syntax element is set to one of different bins that represent respective ones of the plurality of modes. The plurality of modes are arranged, according to an order of decreasing usage frequency of the modes, as the regular merge mode, the merge with motion vector difference mode, the sub-block merge prediction mode, the multi-hypothesis prediction for intra mode, and the triangle prediction unit mode.

In some embodiments, the first syntax element is set to one of different bins that represent respective ones of the plurality of modes, the plurality of modes are arranged according to an order of decreasing usage frequency of the modes.

In some embodiments, a most-frequently used mode of the plurality of modes in a picture that includes the current block is arranged first in the order and represented by a bin of the bins that has a least number of bits.

In some embodiments, the most-frequently used mode is a regular merge mode corresponding to deriving motion information for the current block according to a selected motion information candidate from a list of motion information candidates.

In some embodiments, the processing circuitry is further configured to obtain a second syntax element that is provided after the first syntax element from the coded video bitstream, a second value of the second syntax element indicating an index for selecting a motion information candidate from a list of motion information candidates. When the subset of the plurality of modes indicated by the first value of the first syntax element corresponding to a mode corresponding to deriving motion information for an entirety of the current block according to the selected motion information candidate, the processing circuitry is further configured to obtain a third syntax element from the coded video bitstream when the index indicated by the second value of the second syntax element is smaller than a maximum number of motion information candidates for a merge with motion vector difference mode. In some embodiments, a third value of the third syntax element indicating whether to generate the predictor of the current block according to: (i) a regular merge mode corresponding to deriving motion information for the current block according to a selected motion information candidate from a list of motion information candidates, or (ii) the merge with motion vector difference mode corresponding to deriving the motion information for the current block according to the selected motion information candidate from the list of motion information candidates and motion vector difference information.

In some embodiments, the processing circuitry is further configured to obtain one or more fourth syntax elements that are provided after the third syntax element from the coded video bitstream when the third value of the third syntax element indicates that the mode for generating the predictor of the current block is the merge with motion vector difference mode, the one or more fourth syntax elements indicating the motion vector difference information.

In some embodiments, the first value of the first syntax element indicates whether the mode to be used to generate the predictor of the current block is a block based merge mode or a sub-block based merge mode.

In some embodiments, when the first value of the first syntax element indicates that the mode to be used to generate the predictor of the current block is the block based merge mode, the subset of the plurality of modes includes at least one of a regular merge mode corresponding to deriving motion information for the current block according to a selected motion information candidate from a list of motion information candidates, and a merge with motion vector difference mode corresponding to deriving the motion information for the current block according to the selected motion information candidate from the list of motion information candidates and motion vector difference information.

In some embodiments, when the first value of the first syntax element indicates that the mode to be used to generate the predictor of the current block is the sub-block based merge mode, the subset of the plurality of modes includes at least one of a sub-block merge prediction mode corresponding to splitting the current block into plural rectangular sub-blocks and deriving respective motion information for the plural rectangular sub-blocks, a triangle prediction unit mode corresponding to splitting the current block into triangular sub-partitions and deriving respective motion information for the triangular sub-partitions, and a multi-hypothesis prediction for intra mode corresponding to generating a final predictor for the current block by combining an intra predictor and an inter predictor.

In some embodiments, the processing circuitry is further configured to obtain a second syntax element that is provided after the first syntax element from the coded video bitstream, a second value of the second syntax element indicating an index for selecting the motion information candidate from the list of motion information candidates. When the first value of the first syntax element indicates that the mode to be used to generate the predictor of the current block is the block based merge mode, the processing circuitry is further configured to obtain a third syntax element from the coded video bitstream when the index indicated by the second value of the second syntax element is smaller than a maximum number of motion information candidates for the merge with motion vector difference mode, a third value of the third syntax element indicating whether to generate the predictor of the current block according to the regular merge mode or the merge with motion vector difference mode.

In some embodiments, the processing circuitry is further configured to obtain one or more fourth syntax elements from the coded video bitstream that are provided after the third syntax element when the third syntax element indicates that the mode for generating the predictor of the current block is the merge with motion vector difference mode, the one or more fourth syntax elements indicating the motion vector difference information.

In some embodiments, the processing circuitry is further configured to obtain another syntax element that is provided after the first syntax element from the coded video bitstream, a value of the other syntax element indicating whether the mode for generating the predictor of the current block is a regular merge mode corresponding to deriving motion information for the current block according to a selected motion information candidate from a list of motion information candidates, when the first value of the first syntax element indicates that the subset of the plurality of modes includes at least the regular merge mode.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
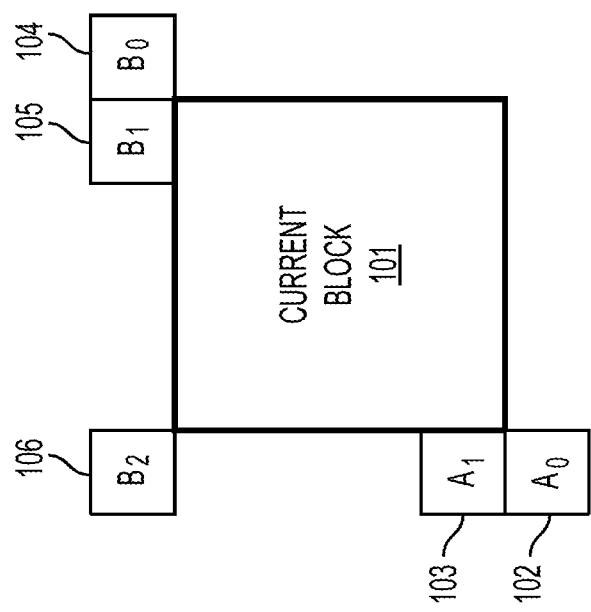
FIG. 1 is a schematic illustration of a current block and its surrounding spatial merge candidates in one example.
Figure 2:
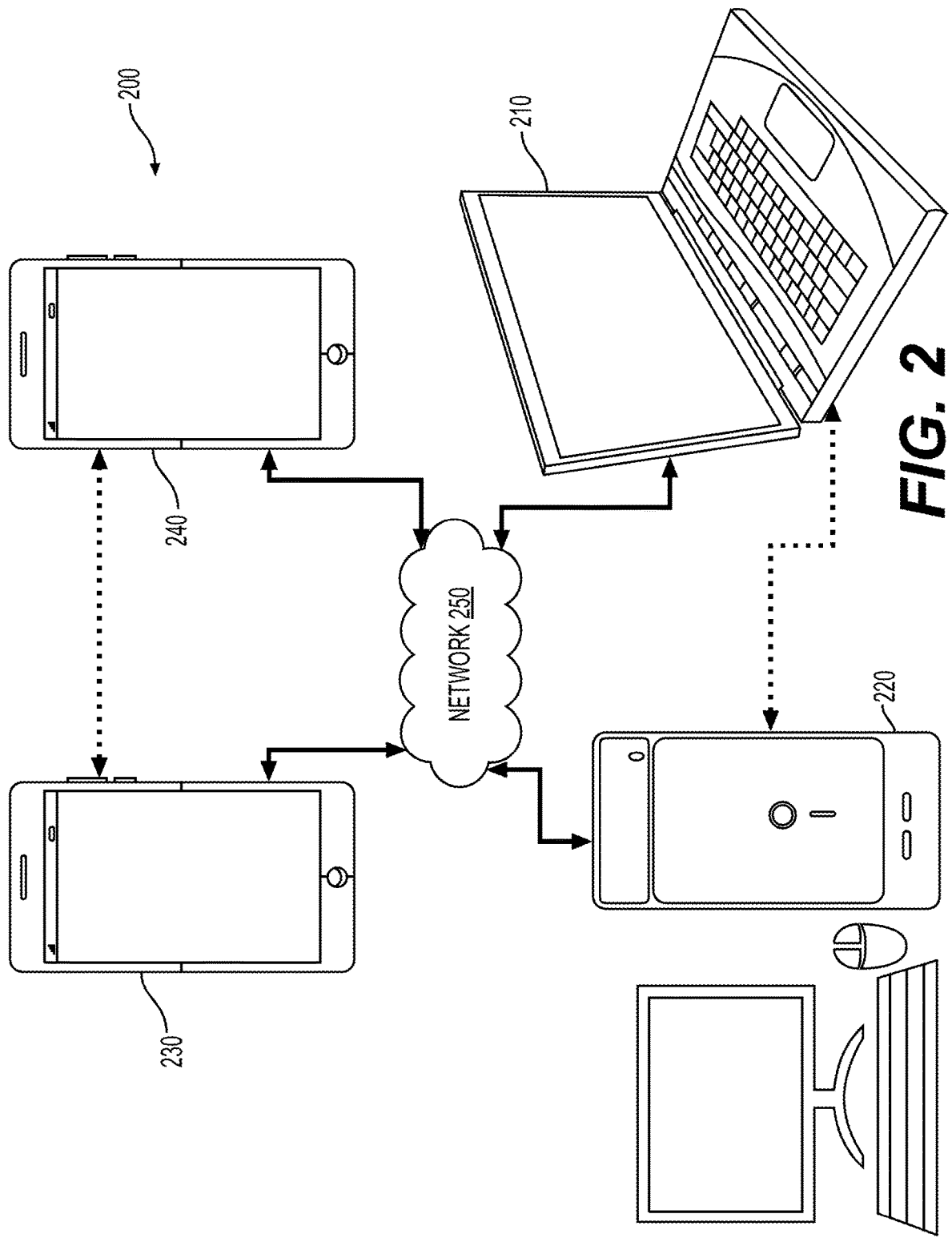
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
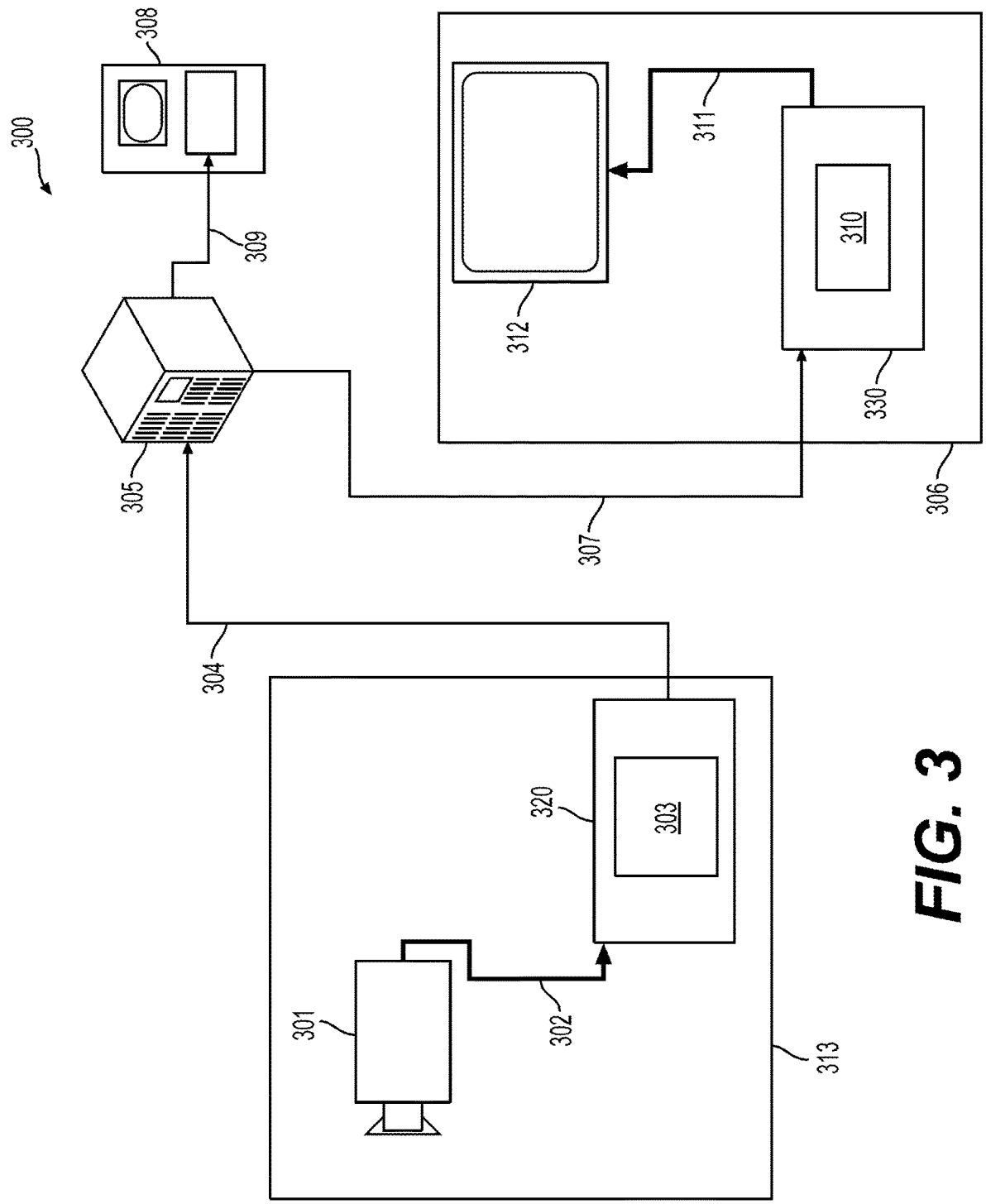
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
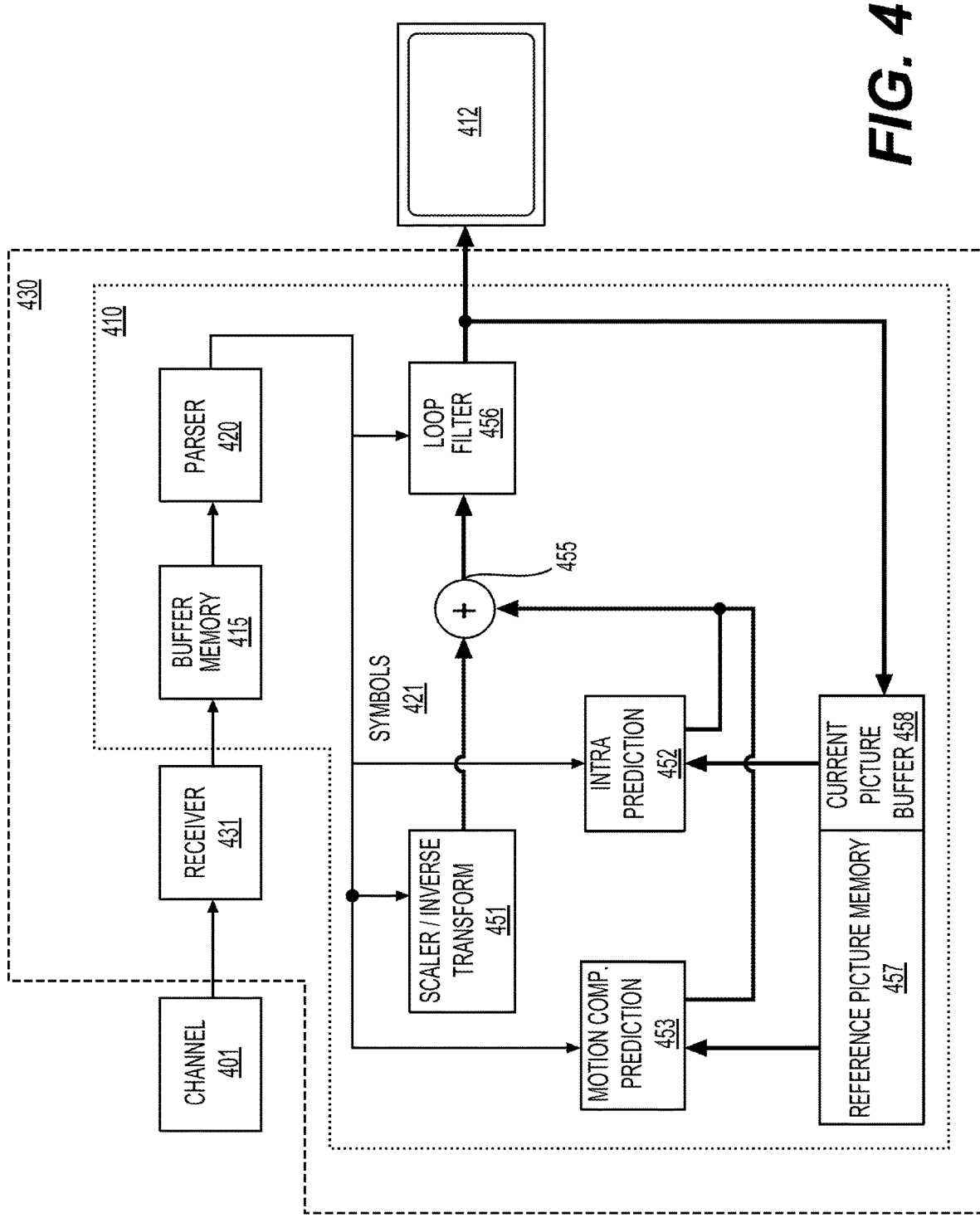
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
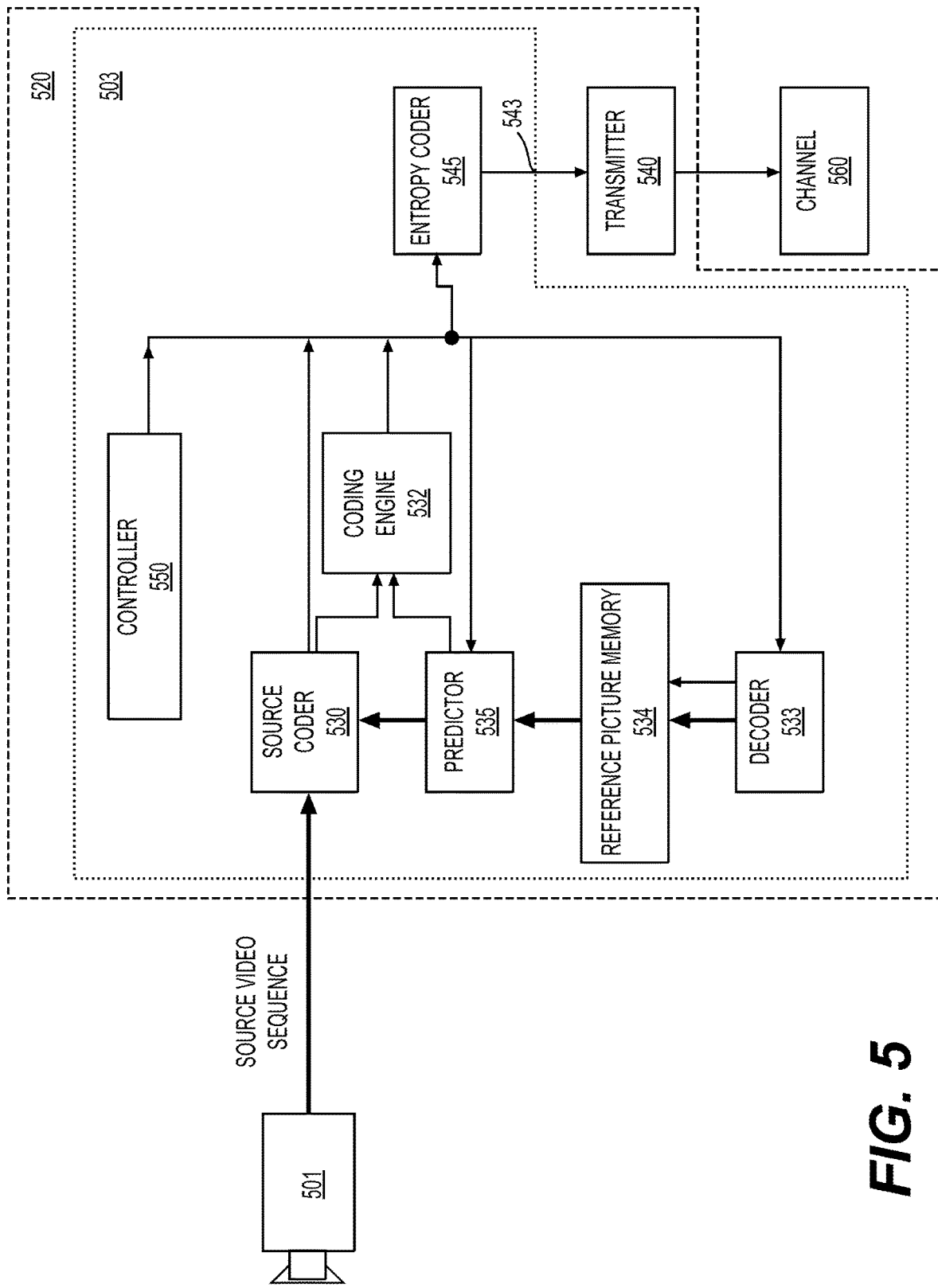
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
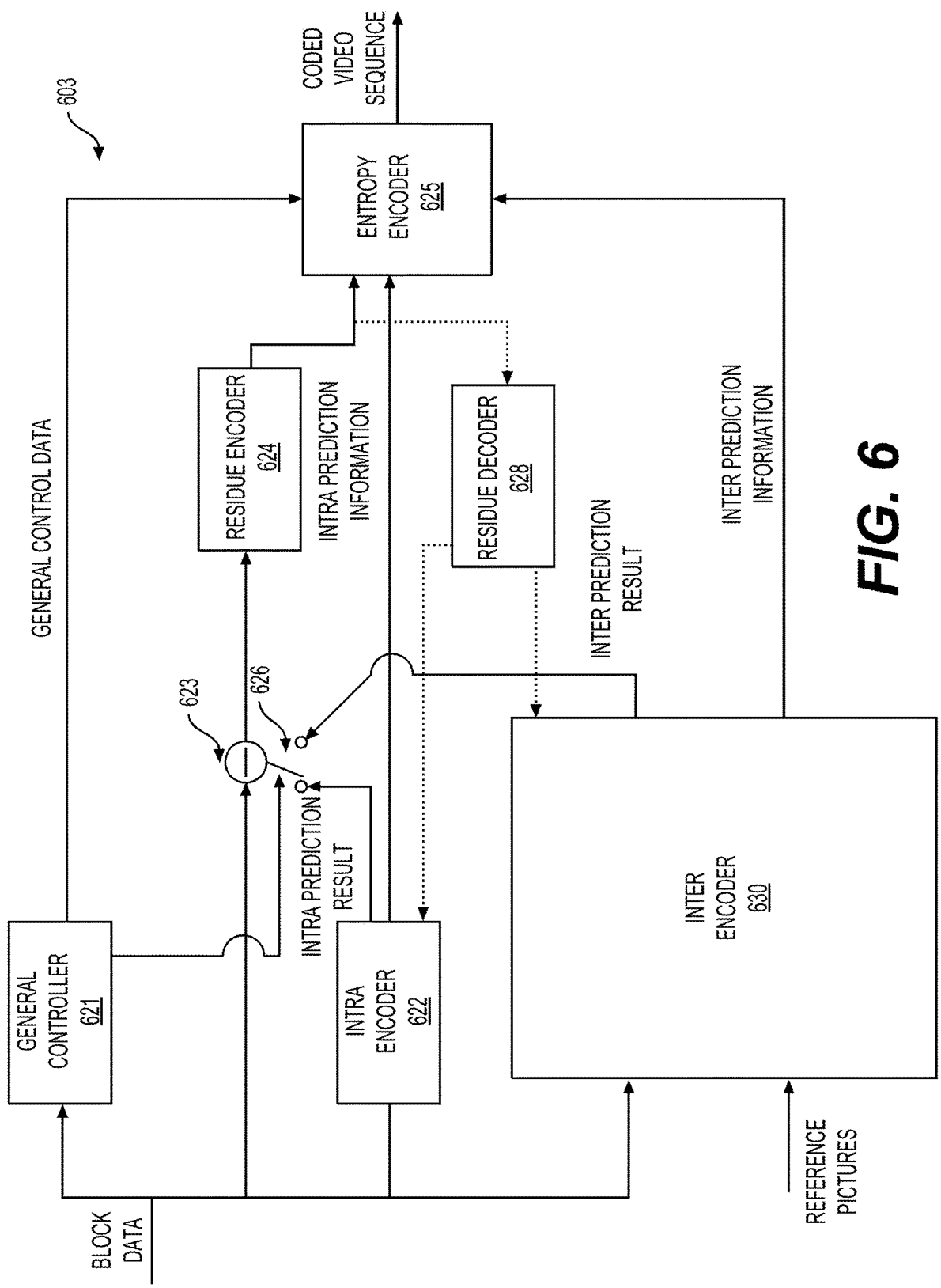
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
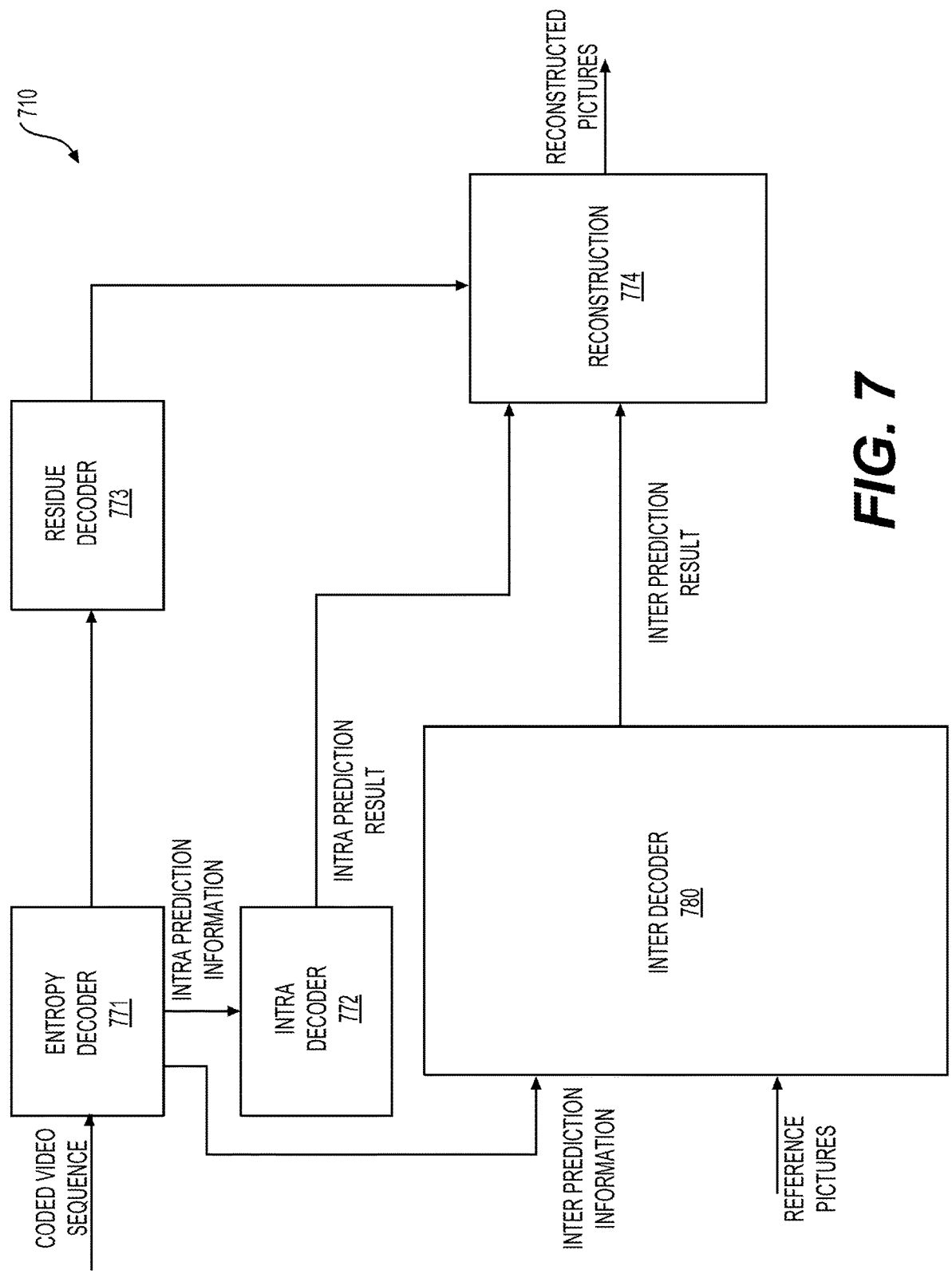
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Figure 8:
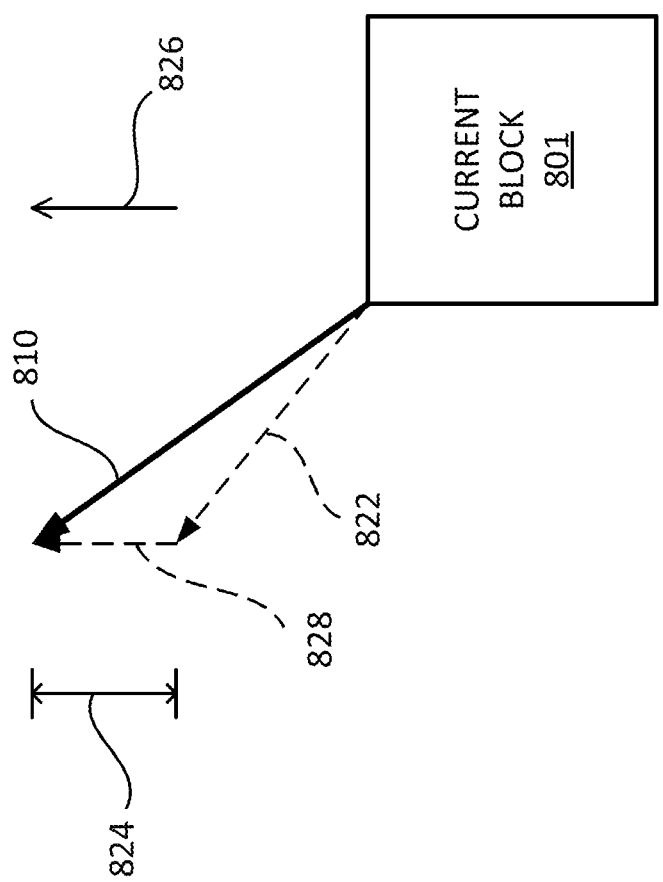
FIG. 8 is a schematic illustration of a current block and a motion vector expressed according to a merge with motion vector difference (MMVD) mode in accordance with an embodiment.

FIG. 8 is a schematic illustration of a current block (801) and a motion vector (810) expressed according to a merge with motion vector difference (MMVD) mode in accordance with an embodiment. A predictor of the current block (801) can be generated by inter-picture prediction based on the motion vector (810).

A motion vector of a block can be expressed by the MMVD mode (or also referred to as an ultimate motion vector expression, UMVE) with simplified signaling. For example, the motion vector (810) for a current block (801) can be expressed using a base motion vector (822), a distance of adjustment (824), and a direction of adjustment (826). The distance of adjustment (824) and the direction of adjustment (826) can be referred to as motion vector difference information for the current block, and together define a difference vector (828). The motion vector (810) can be derived as a combination of the base motion vector (822) and the difference vector (828).

The base motion vector (822) can be selected from a merge candidate list, where the selection information can be indicated by a syntax element (e.g., "base_mv_idx" in VVC), which corresponds to a base candidate index indicating a selected candidate in the merge candidate list for deriving the base motion vector. In some examples, only a portion of the merge candidate list is applicable for selection to determine the base motion vector according to MMVD. In at least one embodiment, the base candidate index can range from 0 to a maximum number defined by a maximum MMVD index (e.g., defined as "max_mmvd_base_idx−1" in VVC). The maximum MMVD index can be a value provided in an applicable video coding standard or signaled in a coded video bitstream.

The distance of adjustment (824) can be indicated by a syntax element (e.g., "distance_idx" in VVC), which corresponds to a distance between the motion vector (810) and the base motion vector (822), or corresponds to a magnitude of the difference vector (828). In some embodiments, the direction of adjustment (826) can be indicated by a syntax element (e.g., "direction_idx" in VVC), which corresponds to a direction from the motion vector (810) to the base motion vector (822), or corresponds to a direction of the difference vector (828).

In some embodiments, to indicate whether a motion vector for a current block is generated according to the MMVD mode, a flag (e.g., "mmvd_flag" in VVC) can be signaled. In some examples, mmvd_flag can be set to 1 when the motion vector for the current block is to be generated according to the MMVD mode; and mmvd_flag can be set to 0 when the motion vector for the current block is not to be generated according to the MMVD mode. In some examples, when mmvd_flag applicable to the current block is not present, mmvd_flag can be inferred to have a value corresponding to the value for indicating that the motion vector for the current block is not to be generated according to the MMVD mode.

In some examples regarding decoding a current block, when mmvd_flag[x0][y0] is set to 1, a motion vector for the current block is to be generated according to the MMVD mode, where (x0, y0) correspond to the location of the top-left luma sample of the current block relative to the top-left luma sample of a current picture that includes the current block. In some examples regarding decoding the current block, after parsing mmvd_flag[x0][y0] and determining that mmvd_flag[x0][y0] is set to 1, the syntax elements base_mv_idx[x0][y0], distance_idx[x0][y0], and direction_idx[x0][y0] can be further parsed to obtain applicable motion vector difference information.

A motion vector of a block can be determined according to a sub-block merge prediction mode. In some examples, the sub-block merge prediction mode can be a sub-block affine merge prediction mode or a sub-block based alternative temporal motion vector prediction (ATMVP) mode.

Figure 9A:
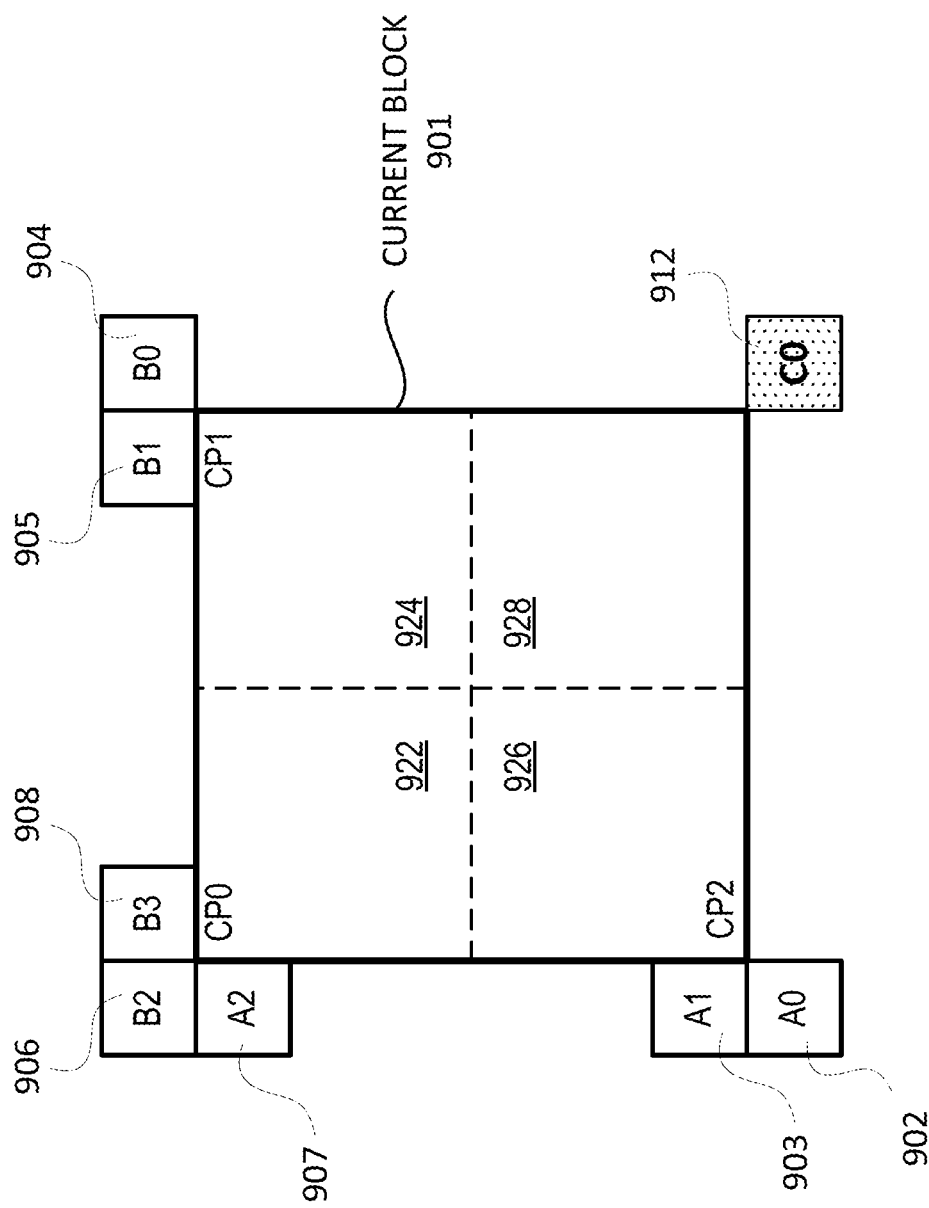
FIG. 9A is a schematic illustration of a current block and spatial neighboring blocks and a temporal neighboring block for the current block according to a sub-block affine merge prediction mode in accordance with an embodiment.

FIG. 9A is a schematic illustration of a current block (901) and spatial neighboring blocks denoted A0, A1, A2, B0, B1, B2, and B3 (902, 903, 907, 904, 905, 906, and 908, respectively) and a temporal neighboring block denoted C0 (912) for the current block according to a sub-block affine merge prediction mode in accordance with an embodiment. In some examples, spatial neighboring blocks A0, A1, A2, B0, B1, B2, and B3 and the current block (901) belong to a same picture. The temporal neighboring block C0 can belong to a reference picture and correspond to a position outside the current block (901) and adjacent to a lower-right corner of the current block (901).

The current block (901) can be divided into sub-blocks (922, 924, 926, and 928). The motion information of each sub-block (922, 924, 926, and 928) inside the current block (901) can be determined according to a sub-block affine merge prediction mode described by a 6-parameter or a simplified 4-parameter affine model. In some examples, an affine model has 6 parameters (e.g., the 6-parameter affine model) to describe the motion vector of a sub-block. In an example, the 6 parameters of a sub-block can be represented by three motion vectors (also referred to as three control point motion vectors) at three different locations of the current block (e.g., control points CP0, CP1, and CP2 at upper-left, upper-right, and lower-left corners of the current block (901) in FIG. 9A). In another example, a simplified affine model (e.g., a 4-parameter affine model) uses four parameters to describe the motion information of a sub-block, which can be represented by two motion vectors (also referred to as two control point motion vectors) at two different locations of the block (e.g., control points CP0 and CP1 at upper-left and upper-right corners in FIG. 9).

Figure 9B:
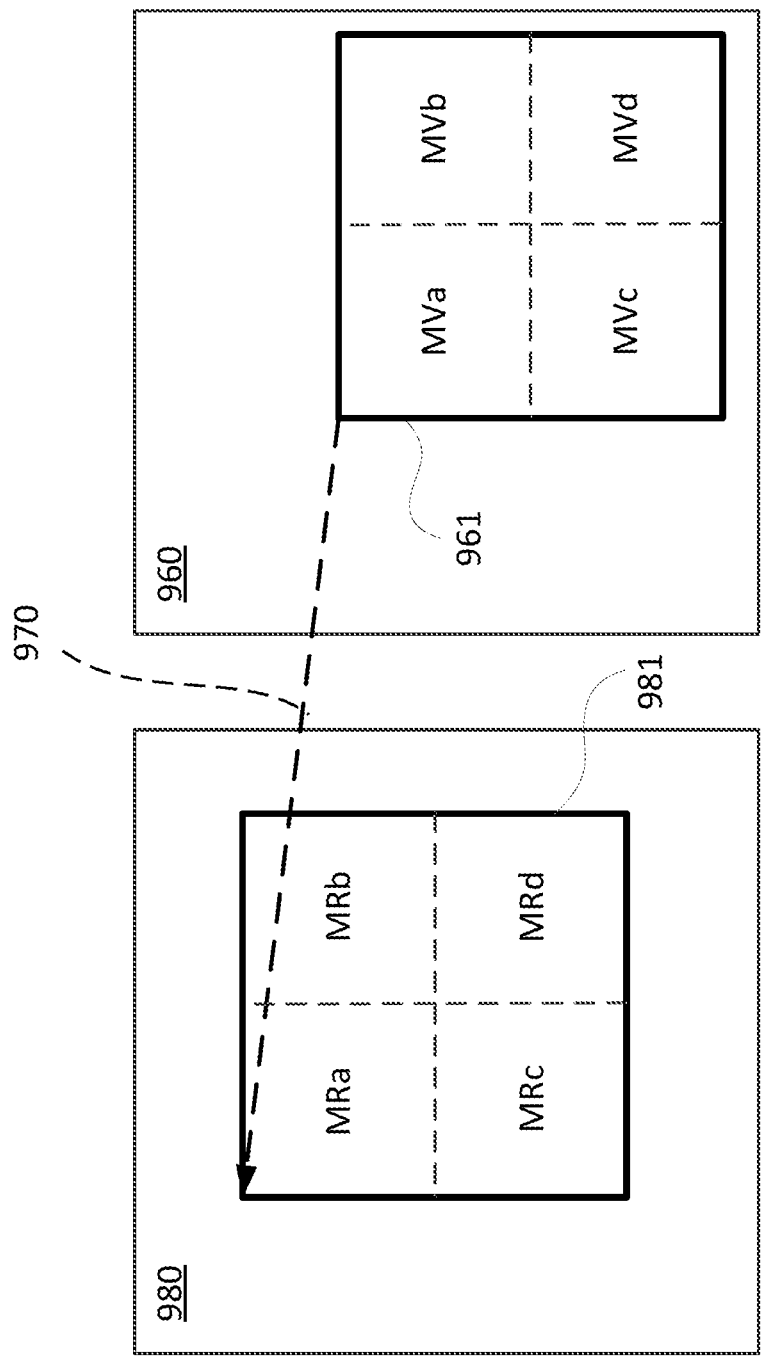
FIG. 9B is a schematic illustration of a current block in a current picture and a reference block in a reference picture according to a sub-block based alternative temporal motion vector prediction (ATMVP) mode in accordance with one embodiment.

FIG. 9B is a schematic illustration of a current block (961) in a current picture (960) and a reference block (981) in a reference picture (980) according to a sub-block based alternative temporal motion vector prediction (ATMVP) mode in accordance with one embodiment. According to the ATMVP mode, the motion vectors of sub-blocks within a block are determined by first identifying a corresponding reference block in a reference picture, and then splitting the current block into sub-blocks and obtaining the motion vectors as well as the reference indices of the sub-blocks in the current block from corresponding motion information of the reference block.

In some examples, the reference picture (960) and a reference vector (970) for a current block (961) can be identified based on decoded information, such as motion information of one or more spatial neighboring blocks of the current block (961) or other applicable approaches. After determining the reference picture (960) and the reference vector (970), the reference block (961) can be identified based on a position of the current block (961) and the determined the reference vector (970).

In FIG. 9B, the reference block (981) can be further divided into 4 sub-blocks with reference motion information MRa through MRd. The motion information can include motion vectors and corresponding reference indices. The current block (961) can be further divided into 4 sub-blocks, and the motion information MVa through MVd for the sub-blocks in the current block (961) can be derived from the reference motion information MRa through MRd, with temporal scaling in some examples. In some embodiments, the reference block (981) and the current block (961) can be divided into more or less than 4 sub-blocks, and the reference block (981) and the current block (961) do not have to have the same number of sub-blocks or the same sub-block partitioning structure.

In some embodiments, to indicate whether a motion vector for a current block is generated according to a sub-block merge prediction mode, such as the sub-block affine merge prediction mode or the ATMVP mode, a flag (e.g., "sub_block_flag" in VVC) can be signaled. In addition, a syntax element (e.g., "merge_idx" in VVC) can be further signaled to indicate which candidate within a sub-block merge candidate list is selected when the flag (e.g., "sub_block_flag" in VVC) indicates that the sub-block merge prediction mode is used.

In some examples regarding decoding a current block, when sub_block_flag[x0][y0] is set to 1, a motion vector for the current block is to be generated according to the sub-block merge prediction mode, where (x0, y0) correspond to the location of the top-left luma sample of the current block relative to the top-left luma sample of a current picture that includes the current block. In some examples regarding decoding the current block, after parsing sub_block_flag[x0][y0] and determining that sub_block_flag[x0][y0] is set to 1, the syntax element merge_idx[x0][y0] can be further parsed to obtain applicable candidate selection information.

Figure 10:
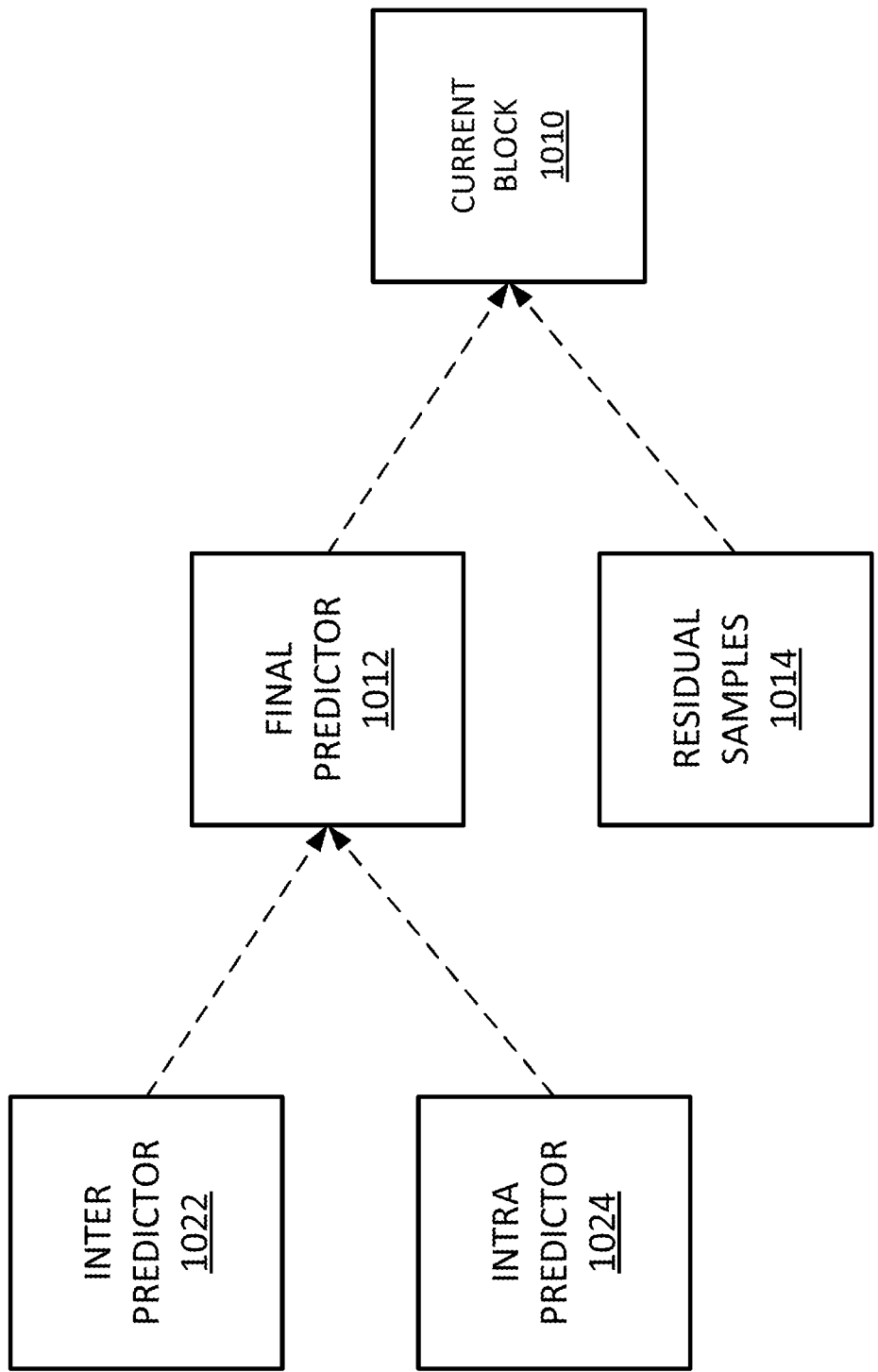
FIG. 10 is a schematic illustration of a current block that is reconstructed according to at least an inter predictor and an intra predictor for the current block according to a multi-hypothesis prediction for intra (MHIntra) mode in accordance with one embodiment

FIG. 10 is a schematic illustration of a current block (1010) that is reconstructed according to at least an inter predictor (1022) and an intra predictor (1024) for the current block (1010) according to a multi-hypothesis prediction for pntra (MHIntra) mode in accordance with one embodiment.

According to the MHIntra mode, the current block (1010) can be reconstructed by combining a final predictor (1012) and residual samples (1014) of the current block (1010). The final predictor (1012) can be generated based on at least one prediction method, such as based on a combination of the inter predictor (1022) generated by inter prediction and the intra predictor (1024) generated by intra prediction. The residual samples (1014) represent the difference between the current block (1010) and the final predictor (1012) and can be obtained by decoding a received video bitstream.

In some embodiments regarding generating the inter predictor (1022), the applicable motion information and reference indices can be explicitly signaled or derived according to a suitable motion information prediction method.

In some embodiments regarding generating the intra predictor (1024), for a luma component of the current block, the applicable intra prediction mode can be selected from an intra candidate list, and the intra candidate list can be derived from 4 intra prediction modes (e.g., a Direct Current mode, a Planar mode, a Horizontal mode, and a Vertical mode). The selection information for determining the applicable intra prediction mode can be indicated by an intra mode index. In some embodiments, for a chroma component of the current block, a Derived mode based on the selected intra prediction mode for the corresponding luma component can be applied without extra signaling.

In order to indicate whether a current block is to be decoded according to the MHIntra mode, a flag (e.g., "MHIntra_flag" in VVC) can be signaled. To further indicate which intra mode is used for generating the intra predictor (1024) when the flag (e.g., "MHIntra_flag") indicates that the MHIntra mode is used, a syntax element (e.g., "MHIntra_mode_idx" in VVC) can be signaled.

In some embodiments regarding decoding a current block, when MHIntra_flag[x0][y0] is set to 1, the current block will be decoded according to the MHIntra mode, where (x0, y0) specifies the location of the top-left luma sample of the current block relative to the top-left luma sample of the picture. In some examples regarding decoding the current block, after parsing MHIntra_flag[x0][y0] and determining that MHIntra_flag[x0][y0] is set to 1, the syntax element MHIntra_mode_idx[x0][y0] can be further parsed to obtain applicable intra prediction mode. Also, after parsing MHIntra_flag[x0][y0] and determining that MHIntra_flag[x0][y0] is set to 1, to further indicate the motion information for generating the inter predictor (1022) of the current block (1010), the motion information can be explicitly signaled or derived based on information signaled by one or more additional syntax elements.

Figure 11:
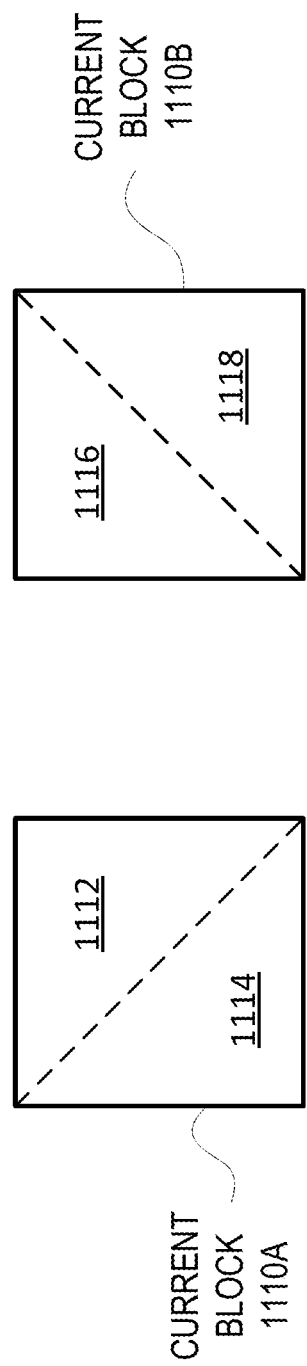
FIG. 11 is a schematic illustration of two splitting examples for a current block according to a triangle prediction unit mode in accordance with one embodiment.

FIG. 11 is a schematic illustration of two splitting examples for a current block (1110A or 1110B) according to a triangle prediction unit mode in accordance with one embodiment. In some embodiments according to the triangle prediction unit mode, a current block (1110A or 1110B) can be split into two triangular prediction units. In some examples, each triangular prediction unit in the current block (1110A or 1110B) can be inter-predicted based on respective uni-prediction motion vector and reference frame index. After predictors for the triangular prediction units are generated, an adaptive weighting process can be applied to the diagonal edge between the two triangular prediction units to derive a final predictor for the current block (1110A or 1110B).

In Example 1 shown in FIG. 11, the current block (1110A) can be divided into two triangular prediction units (1112 and 1114) along a diagonal extending from a top-left corner to a bottom-right corner of the current block (1110A). In some examples, such as Example 2 as shown in FIG. 11, the current block (1110B) can be divided into two triangular prediction units (1116 and 1118) along a diagonal extending from a top-right corner to a bottom-left corner of the current block (1110B).

In some embodiments, to indicate whether a current block is to be decoded according to the triangle prediction unit mode, a flag (e.g., "merge_triangle_flag" in VVC) can be signaled. To further indicate the splitting method and the indices of the candidates used by the two triangular prediction units, one or more syntax elements (e.g., "merge_triangle_idx," "merge_triangle_idx0" and/or "merge_triangle_idx1" in VVC) can be signaled.

In some embodiments regarding decoding a current block, when merge_triangle_flag[x0][y0] is set to 1, the current block will be decoded according to the triangle prediction unit mode, where (x0, y0) specifies the location of the top-left luma sample of the current block relative to the top-left luma sample of the picture. In some examples regarding decoding the current block, after parsing merge_triangle_flag[x0][y0] and determining that merge_triangle_flag[x0][y0] is set to 1, the syntax element merge_triangle_idx[x0][y0] can be parsed to obtain applicable division direction and the syntax elements merge_triangle_idx0[x0][y0] and merge_triangle_idx1[x0][y0] can be further parsed to obtain applicable candidate selection information for different triangular prediction units.

All the coding modes described with references to FIGS. 8 to 11 are available for video coding. In some examples, which mode is used to decode a particular block can be determined based on various flags, such as flags mmvd_flag, sub_block_flag, MHIntra_flag, and merge_triangle_flag. In some examples, a portion or all of the aforementioned flags can be signaled according to an order of mmvd_flag, sub_block_flag, MHIntra_flag, and merge_triangle_flag, and not all of these flags need to be signaled, provided the signaled portion of the flags can unambiguously specify the applicable mode used to decode the particular block.

These flags can be conditionally signaled as illustrated in Table I, where the syntax elements and the corresponding conditions for signaling the respective syntax elements are listed. In Table I, a flag being "False" represents the coding mode represented by such flag is not used for a current block, and a flag being "True" represents the coding mode represented by such flag is used for a current block.

TABLE I

The coding condition of merge related syntax elements.

| Syntax elements | If "True" | Signaling Condition |
|---|---|---|
| mmvd_flag | Using MMVD mode | Always |
| sub_block_flag | Using sub-block merge prediction mode (affine or ATMVP) | mmvd_flag == false && width >=8 && height >= 8 |
| MHIntra_flag | Using MHIntra mode | mmvd_flag == false && sub_block_flag == false && width*height >= 64 && width < 128 && height < 128 |
| merge_triangle_flag | Using triangle prediction unit mode | mmvd_flag == false && sub_block_flag == false && MHIntra_flag == false && width*height >= 64 |

In some embodiments according to Table I, when flags mmvd_flag, sub_block_flag, MHIntra_flag, and merge_triangle_flag are all set to false, a regular merge mode is used where a syntax element merge_idx for regular merge mode is signaled.

The regular merge mode may be a most-frequently used mode in a particular picture. Therefore, the flags or syntax elements may be reconfigured so it does not need to signal all flags mmvd_flag, sub_block_flag, MHIntra_flag, and merge_triangle_flag every time the regular merge mode is used. Also, to improve the coding efficiency, the syntax element merge_idx may be configured to represent various parameters for different modes. For example, the syntax element merge_idx may indicate candidate selection information for the regular merge mode and may indicate base vector selection information for the MMVD mode.

In addition, the flags and/or syntax elements may be reconfigured as follows. A block may correspond to a prediction block, a coding block, or a coding unit, and the term width and height denote the width and height of a block.

In some embodiments, a new syntax element (denoted as "merge_list_idc" in this disclosure) can be introduced in place of some or all of flags mmvd_flag, sub_block_flag, MHIntra_flag, and merge_triangle_flag. For example, merge_list_idc can be set to 0 (or False) to indicate that the regular merge mode is used, and merge_list_idc can be set to 1 (or True) to indicate that the regular merge mode is not used. When merge_list_idc is True, which modes among all other modes may be signaled or derived based on one or more additional flags or syntax elements, which is not limited to the modes, flags, or syntax elements described herein and can be simplified or expanded.

In one example, merge_list_idc can be used to signal whether the regular merge mode is used, a value of sub_block_flag, and a value of merge_triangle_flag. The flags mmvd_flag and MHIntra_flag can be conditionally signaled or inferred according to the value of merge_list_idc. In some examples, merge_list_idc can be binarized according to the usage frequency of the signaled flags (corresponding to the usage frequency of the respective modes), where the most frequently used flag has the smallest length code and the least frequently used flag has the longest length code. For example, various values of merge_list_idc after binarization can represent the following settings: "0" means the regular merge mode is used, "10" means the sub_block_flag is True (i.e., the sub-block merge prediction mode is used), and "11" means the merge_triangle_flag is True (i.e., the triangle prediction unit mode is used).

In another embodiment, merge_list_idc can be used to signal whether the regular merge mode is used, a value of mmvd_flag, a value of sub_block_flag, and a value of merge_triangle_flag. The MHIntra_flag can be inferred according to the value of merge_list_idc. In some examples, merge_list_idc can also be binarized according to the usage frequency of the signaled flags (corresponding to the usage frequency of the respective modes), where the most frequently used flag has the smallest length code and the least frequently used flag has the longest length code. For example, various values of merge_list_idc after binarization can represent the following settings: "0" means the regular merge mode is used, "10" means the mmvd_flag is True (i.e., the MMVD mode is used), "110" means the sub_block_flag is True (i.e., the sub-block merge prediction mode is used), and "111" means the merge_triangle_flag is True (i.e., the triangle prediction unit mode is used).

In another embodiment, merge_list_idc can be used to signal whether the regular merge mode is used, a value of mmvd, a value of sub_block, and a value of MHIntra. If more merge modes are added to merge_list_idc, simple extension may be applied.

In some examples, for binarization of merge_list_idc, truncated unary code may be used. In some embodiments, first one or two bins are variable length coded while the remaining bins are fixed length coded. Basically, the order of indicating the use of various modes in merge_list_idc may be arranged based on the usage frequency of these merge modes. In some examples, it is not necessary to place the most-frequently used mode as the first (hence may correspond to a smallest length code). In one embodiment, the merge modes are ordered based on the absolute difference between the usage frequency and 50%. For example, the mode which has the largest absolute difference can be placed as the first one.

In one embodiment, the binarization of merge_list_idc can be performed based on Table II.

TABLE II

First binarization table example for merge_list_idc

| Binarization | Mode |
|---|---|
| 1 | Regular merge mode |
| 01 | MMVD mode |
| 001 | Sub-block merge prediction mode |
| 0001 | MHIntra mode |
| 0000 | Triangle prediction unit mode |

In another embodiment, the binarization of merge_list_idc can be performed based on Table III.

TABLE III

Second binarization table example for merge_list_idc

| Binarization | Mode |
|---|---|
| 1 | MMVD mode |
| 01 | Sub-block merge prediction mode |
| 001 | MHIntra mode |
| 0001 | Triangle prediction unit mode |
| 0000 | Regular merge mode |

In another embodiment, the binarization of merge_list_idc can be performed based on Table IV.

TABLE IV

Third binarization table example for merge_list_idc

| Binarization | Mode |
|---|---|
| 1 | MHIntra mode |
| 01 | Triangle prediction unit mode |
| 001 | Sub-block merge prediction mdoe |
| 0001 | MMVD mode |
| 0000 | Regular merge mode |

In another embodiment, the binarization of merge_list_idc can be performed based on Table V.

TABLE V

Third binarization table example for merge_list_idc

| Binarization | Mode |
|---|---|
| 1 | Sub-block merge prediction mode |
| 01 | Triangle prediction unit mode |
| 001 | MHIntra mode |
| 0001 | MMVD mdoe |
| 0000 | Regular merge mode |

The merge_list_idc may be signaled in a high-level syntax structure in a bitstream, such as in Sequence Parameter Set (SPS), Picture Parameter Set (PPS), or slice header, or tile group header, or tile header, or a suitable header that is associated with a picture or a fraction of a picture.

The merge_list_idc can be coded with context model. In one example, the merge_list_idc from the spatial neighboring blocks that are above or left to a current block are used to derive the context model for coding the merge_list_idc of the current block. In one example, width and height of the current block can be used to derive the context model for coding the merge_list_idc of the current block. In some embodiments, each bin of merge_list_idc can be context coded, where different bins may use different contexts. In one example, the bin indicating regular merge mode can be coded according to spatial neighbors as context. In another example, the bin indicating sub-block merge prediction mode can be coded according to one single context which is not dependent on spatial neighbors.

In some embodiments, the MMVD related syntax elements that indicate corresponding MMVD related information, such as mmvd_flag and/or motion vector difference information, can be signaled after signaling merge_list_idc or a dedicated flag (denoted "regular_merge_flag" in this disclosure) indicating whether the regular merge mode is used, and after the syntax element merge_idx is signaled. In one example, the syntax element merge_idx is signaled after regular_merge_flag/merge_list_idc and before mmvd_flag, sub_block_flag, MHIntra_flag, and merge_triangle_flag, if any, signaled for a current block.

In another example, the regular_merge_flag/merge_list_idc is firstly signaled to explicitly indicate whether the regular merge mode is used or not, and then the syntax element merge_idx is signaled. In some embodiments, information carried by "base_mv_idx" described above can be signaled by "merge_idx." After signaling regular_merge_flag/merge_list_idc and merge_idx, the MMVD related syntax elements can be conditionally signaled. In one example, if regular_merge_flag/merge_list_idc indicates that the regular merge mode or the MMVD mode can be used and a candidate index indicated by merge_idx is smaller than max_mmvd_base_idx, it is possible that MMVD mode could be used and the mmvd_flag is further signaled; otherwise, the MMVD mode can be ruled out and thus the mmvd_flag is inferred to be False and not signaled. If the mmvd_flag is True, the syntax elements distance_idx and direction_idx are signaled.

In some embodiments, the regular merge mode and MMVD mode can be categorized as block based merge modes, and sub-block merge prediction mode (including ATMVP and affine modes), triangle merge prediction mode, and MHIntra mode can be categorized as sub-block based merge modes. Accordingly, merge_list_idc can be used to signal whether the mode for coding the current block is one of the block based merge modes or the sub-block based merge modes.

For example, when merge_flag is True indicating that a merge mode is used, a flag merge_list_idc can be signaled to indicate whether the current block is coded according to one of the block based merge modes or the sub-block based merge modes. In some examples, merge_idx is signaled after merge_list_idc but before all other merge related flags; or it can be signaled after all other merge related flags.

When one of the block based merge modes is used, depending on the merge_idx value (if signaled before all other merge related flags), mmvd_flag may be signaled. In such examples, information carried by "base_mv_idx" described above can be signaled by "merge_idx" instead. For example, if merge_list_idc indicates that the regular merge mode or the MMVD mode can be used and a candidate index indicated by merge_idx is smaller than max_mmvd_base_idx, it is possible that MMVD mode could be used and the mmvd_flag is signaled; otherwise, the MMVD mode can be ruled out and thus the mmvd_flag is inferred to be False and not signaled. If the mmvd_flag is True, MMVD mode related information will be further signaled.

When one of the sub-block merge modes is used, depending on the merge_idx value, (if signaled before all other merge related flags), sub_block_merge_flag (corresponding to affine merge mode and ATMVP mode) may be signaled. In one example, when a sub-block merge mode is used, and sub_block_merge_flag is False, depending on the conditions to enable MHIntra mode, MHIntra_flag may be signaled. If MHIntra_flag is True, MHIntra mode related information will be further signaled. In one example, when sub-block merge mode is used, and sub_block_merge_flag and MHIntra_flag are False, depending on the conditions to enable triangle prediction unit mode, merge_triangle_flag may be signaled. If merge_triangle_flag is True, triangle prediction unit mode related information will be further signaled.

The modes and orders of different modes in a category described above are non-limiting examples and can be changed or varied. For example, triangle prediction unit mode may be considered or checked before MHIntra mode and used as conditions for signaling the flags corresponding to other modes.

In at least one embodiment, a syntax design according to various examples described herein can be configured as follows:

```
if(merge_flag)
{
  merge_list_idc; // 0 block merge modes; 1 sub-block merge modes
  merge_idx;
  if(merge_list_idc==0 && merge_idx<= max_mmvd_based_index)
  {
    mmvd_flag;
    if(mmvd_flag)
```

```
    {
        mmvd_info;
    }
  }
}
else//if(merge_list_idc !=0)
{
    if(merge_idx <= sub block merge size) // in case the two list
    is not same size
    sub_block_merge_flag; // ATMVP and Affine
    if (!sub_block_merge_flag)
    {
        if(MHIntra mode conditions) // add enabling conditions
        MHIntra_flag;
        if(MHIntra_flag)
        {
            MHIntra_info;
        }
    }
    // if sub_block_merge_flag is true, MHIntra_flag should be False
    by inference
    if(!MHIntra_flag && !sub_block_merge_flag)
    {
        if(triangle prediction unit mode conditions) // add enabling
        conditions
        merge_triangle_flag;
        if(merge_triangle_flag)
        {
            merge_triangle_info;
        }
    }
}
```

In some embodiments, a new syntax element regular_merge_flag can be introduced to explicitly indicate whether the regular merge mode is used or not. If regular_merge_flag is set to True, the regular merge mode is used.

The syntax element regular_merge_flag is coded with context model. In one example, the regular_merge_flag of the current block is coded with a fixed context model. For example, the context model with index 0 is always used for coding the regular_merge_flag.

In another example, the regular_merge_flag from the spatial neighboring blocks above and left to the current block are used to derive the context model for coding the regular_merge_flag of the current block. In one example, if the regular_merge_flag from the spatial neighboring blocks above and left to the current block are all False, the context model with index 0 can be used for coding the regular_merge_flag for the current coding block. In one example, if the regular_merge_flag from the spatial neighboring blocks above and left to the current block are all True, the context model with index 2 can be used for coding the regular_merge_flag for the current coding block. In some examples, if the regular_merge_flag from the spatial neighboring blocks above and left to the current block are not all False and are not all True, the context model with index 1 can be used for coding the regular_merge_flag for the current coding block.

In another example, if the regular_merge_flag from the spatial neighboring blocks above and left to the current block are all False, the context model with index 0 can be used for coding the regular_merge_flag for the current coding block; otherwise, the context model with index 1 can be used for coding the regular_merge_flag for the current coding block.

Figure 12A:
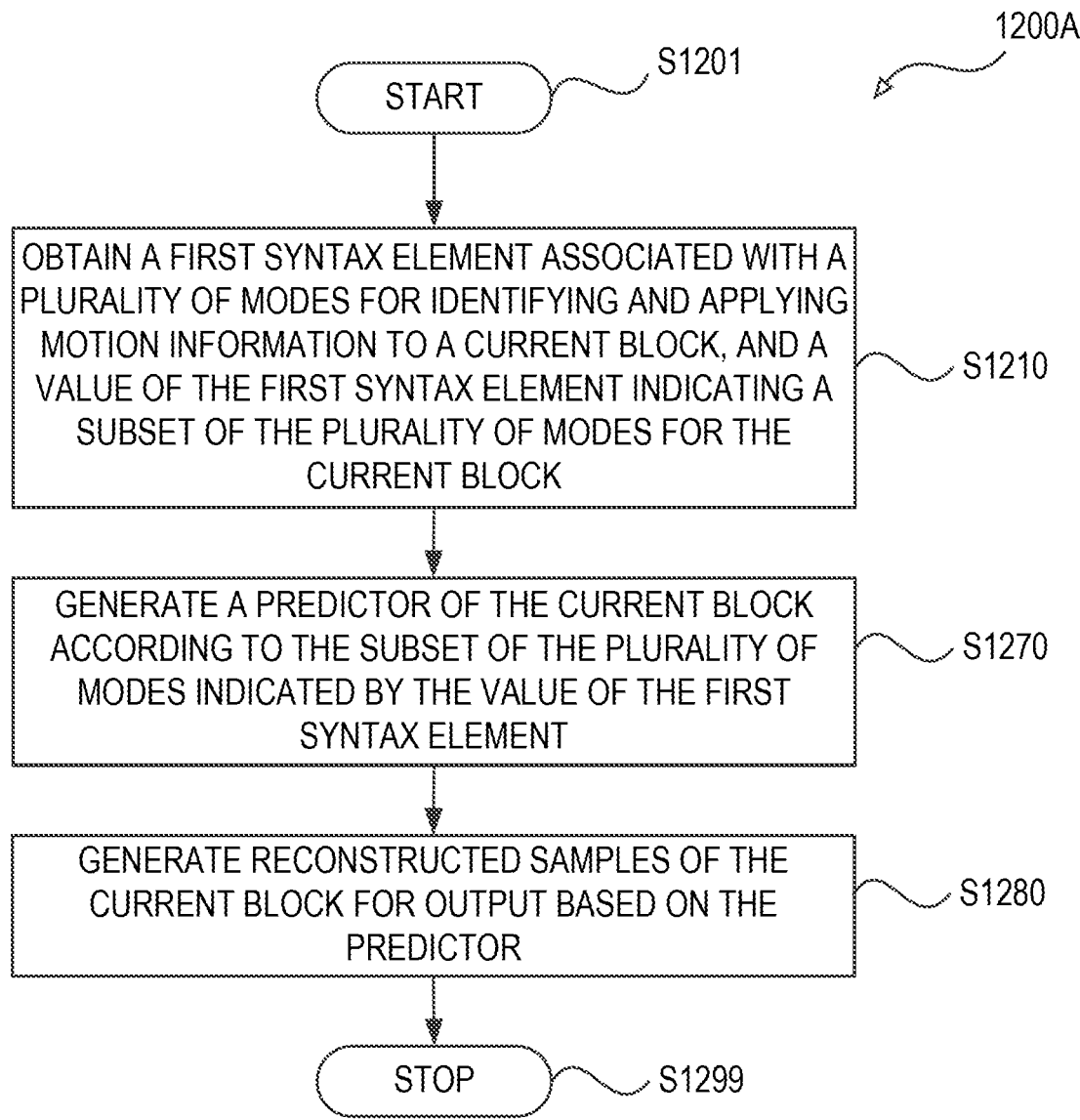
FIG. 12A shows a flow chart outlining a decoding process (1200A) according to an embodiment of the disclosure.

FIG. 12A shows a flow chart outlining a decoding process (1200A) according to an embodiment of the disclosure. The process (1200A) can be used to determine a mode for identifying and applying motion information to a block (i.e., a current block) of a picture. In some embodiments, one or more operations are performed before or after process (1200A), and some of the operations illustrated in FIG. 12A may be reordered or omitted.

In various embodiments, the process (1200A) is executed by processing circuitry, such as the processing circuitry in the terminal devices (210), (220), (230), and (240), the processing circuitry that performs functions of the video decoder (310), (410), or (710), and the like. In some embodiments, the process (1200A) is implemented by software instructions, thus when the processing circuitry executes the software instructions, the processing circuitry performs the process (1200A). The process starts at (S1201) and proceeds to (S1210).

At (S1210), a first syntax element is obtained from a coded video bitstream. The first syntax element is associated with a plurality of modes for identifying and applying motion information to the current block. A first value of the first syntax element can indicate a subset of the plurality of modes for the current block. In some embodiments, the first syntax element corresponds to syntax element "merge_list_idc" described above.

The plurality of modes includes a regular merge mode corresponding to deriving motion information for the current block according to a selected motion information candidate from a list of motion information candidates, a sub-block merge prediction mode corresponding to splitting the current block into plural rectangular sub-blocks and deriving respective motion information for the plural rectangular sub-blocks, and a triangle prediction unit mode corresponding to splitting the current block into two triangular sub-partitions and deriving respective motion information for the triangular sub-partitions. The plurality of modes can further include a merge with motion vector difference (MMVD) mode corresponding to deriving the motion information for the current block according to the selected motion information candidate from the list of motion information candidates and motion vector difference information. The plurality of modes further includes a multi-hypothesis prediction for intra (MHIntra) mode corresponding to generating a final predictor for the current block by combining an intra predictor and an inter predictor.

The subset of the plurality of modes for the current block indicated by the value of the first syntax element can include a single mode or one of a plurality of subsets of modes. In one example, the value of the first syntax element can indicate whether the motion information of the current block is to be derived according to the regular merge mode. In one example, the value of the first syntax element can indicate that the motion information of the current block is to be derived according to the regular merge mode or the merge with motion vector difference mode. In one example, the value of the first syntax element can indicate that the motion information of the current block is to be derived according to the sub-block merge prediction mode, the triangle prediction unit mode, or the MHIntra mode.

The first syntax element is set to one of different bins that represent respective ones of the plurality of modes. The plurality of can be arranged according to a predetermined order consistent with an order of decreasing usage frequency of the modes. In some examples, the order can be arranged consistent, in whole or in part, with any one of the examples illustrated in Tables II-V. For any two modes of the plurality of modes, a code length for coding one of the two modes that is arranged in front of the other one of the two modes in the order is not greater than a code length for coding the other one of the two modes. For example, an order of the regular merge mode, the MMVD mode, the sub-block merge prediction mode, the MHIntra mode, and the triangle prediction unit mode, as illustrated in Table II.

In some embodiments, a most-frequently used mode of the plurality of modes in a picture that includes the current block is arranged first in the order and represented by a bin of the bins that has a least number of bits. In at least one example, the most-frequently used mode is the regular merge mode.

In some embodiments, if the subset of the plurality of modes for the current block corresponds to more than one mode, the applicable mode within the subset of the plurality of modes can be derived or determined according to one or more additional syntax elements or flags provided after the first syntax element. Additional non-limiting examples of determining the applicable mode from the subset of the plurality of modes will be further illustrated with reference to FIG. 12B.

At (S1270), a predictor of the current block is generated according to the subset of the plurality of modes indicated by the first value of the first syntax element. In some embodiments, the predictor of the current block can be generated according to the applicable mode within the subset of the plurality of modes by at least inter prediction.

At (S1280), reconstructed samples of the current block are generated (e.g., for output) based on at least the predictor from (S1270).

After (S1280), the process proceeds to (S1299) and terminates.

Figure 12B:
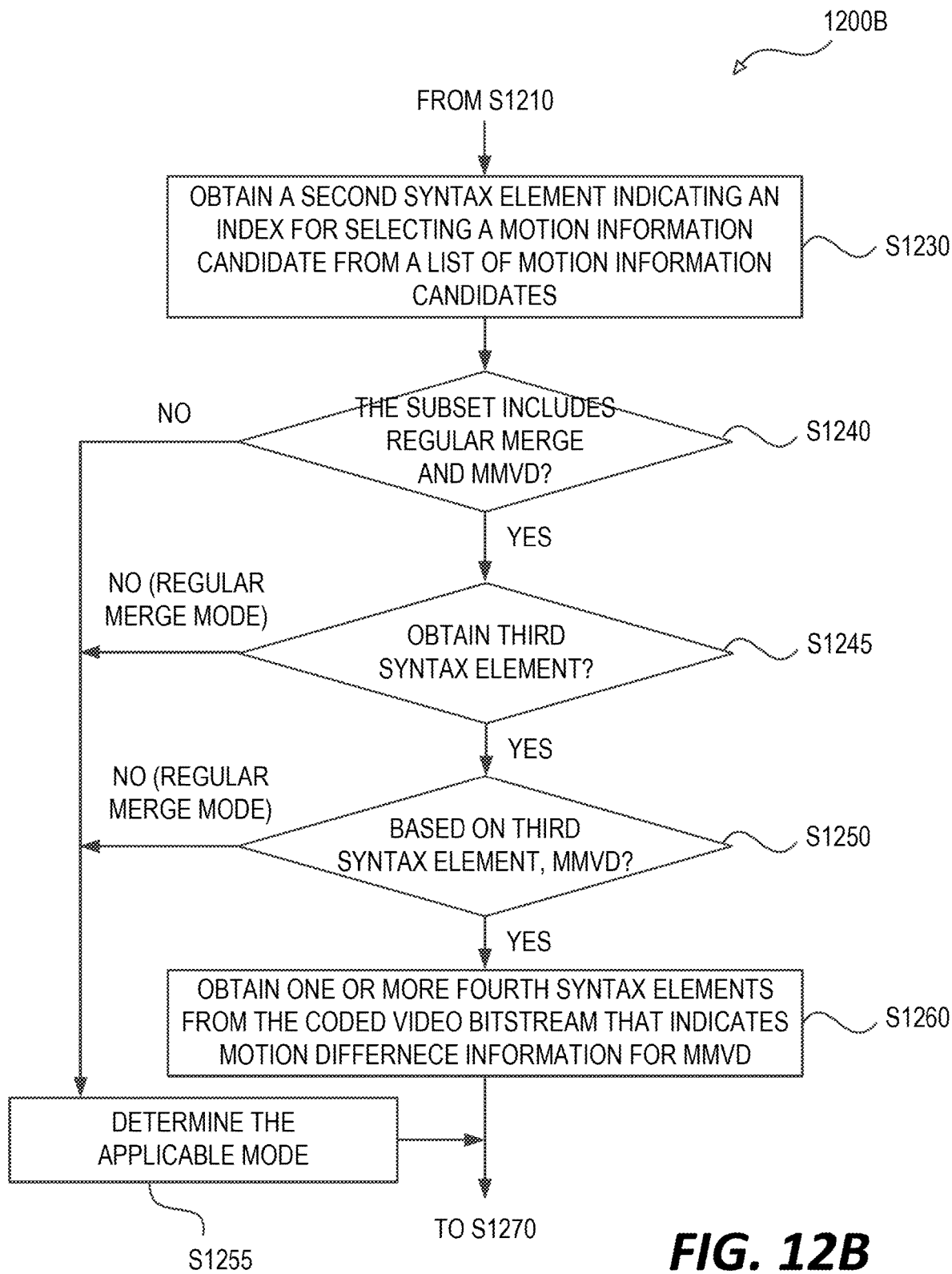
FIG. 12B shows a flow chart outlining another decoding process (1200B) according to an embodiment of the disclosure.

FIG. 12B shows a flow chart outlining another decoding process (1200B) according to an embodiment of the disclosure. The process (1200B) can be inserted between (S1210) and (S1270) in process (1200A) in FIG. 12A and thus can also include (S1201), (S1210), (S1270), (S1280), and (S1299). Therefore, (S1201), (S1210), (S1220), (S1270), (S1280), and (S1299) are not shown or further illustrated in FIG. 12B.

The process (1200B) can be used to determine a mode for identifying and applying motion information to a block (i.e., a current block) of a picture. In some embodiments, one or more operations are performed before or after process (1200B), and some of the operations illustrated in FIG. 12B may be reordered or omitted.

In various embodiments, the process (1200B) is executed by processing circuitry, such as the processing circuitry in the terminal devices (210), (220), (230), and (240), the processing circuitry that performs functions of the video decoder (310), (410), or (710), and the like. In some embodiments, the process (1200B) is implemented by software instructions, thus when the processing circuitry executes the software instructions, the processing circuitry performs the process (1200B). The process starts at (S1201) and proceeds to (S1210) and then to (S1230).

At (S1230), a second syntax element that is provided after the first syntax element from the coded video bitstream is obtained. A second value of the second syntax element indicates an index for selecting a motion information candidate from a list of motion information candidates. In some embodiments, the second syntax element corresponds to syntax element "merge_idx" described above.

At (S1240), it is determined whether the subset of the plurality of modes includes the regular merge mode and the MMVD mode. If the subset includes the regular merge mode and the MMVD mode, the process proceeds to (S1245); otherwise, the process proceeds to (S1255).

In some embodiments, whether the subset of the plurality of modes includes the regular merge mode and the MMVD mode can be determined according to the first value of the first syntax element. In some embodiments, when the first value of the first syntax element indicates that the mode to be used to generate the predictor of the current block is a block based merge mode, the subset of the plurality of modes includes at least one of the regular merge mode and the MMVD mode. In some embodiments, when the first value of the first syntax element indicates that the mode to be used to generate the predictor of the current block is a sub-block based merge mode, the subset of the plurality of modes includes at least one of the sub-block merge prediction mode, the triangle prediction unit mode, and the MHIntra mode.

In some embodiments, at (S1240), whether the subset of the plurality of modes includes the regular merge mode and the MMVD mode can be further determined according to yet another syntax element that is provided after the first syntax element from the coded video bitstream. A value of the other syntax element explicitly indicates whether the mode for generating the predictor of the current block is a regular merge mode, when the first value of the first syntax element indicates that the subset of the plurality of modes includes at least the regular merge mode. In some embodiments, the yet another syntax element corresponds to syntax element "regular_merge_flag" described above.

At (S1245), whether to obtain a third syntax element is determined, where a third value of the third syntax element indicates whether to generate the predictor of the current block according to the regular merge mode or the MMVD mode. In some embodiments, when the index indicated by the second value of the second syntax element is smaller than a maximum number of motion information candidates for the MMVD mode, the third syntax element is obtained from the coded video bitstream and the process proceeds to (S1250); otherwise, the third syntax element does not need to be obtained, the applicable mode for the current block can be determined to be the regular merge mode, and the process proceeds to (S1255). In some embodiments, the third syntax element corresponds to syntax element "mmvd_flag" described above.

At (S1250), based on the obtained third syntax element, whether the applicable mode for the current block is the regular merge mode or the MMVD mode can be determined. If it is indicated by the value of the third syntax element that the MMVD mode is used, the process proceeds to (S1260); otherwise, the applicable mode can be determined to be the regular merge mode and the process proceeds to (S1255).

At (S1255), the applicable mode for the current block has been determined as the regular merge mode, or to be determined based on one or more additional flags as one of other possible modes, such as one of the sub-block merge prediction mode, the triangle prediction unit mode, and/or the MHIntra mode. In some embodiments, the one or more additional flags correspond to one or more of "sub_block_flag," "MHIntra_flag," and "merge_triangle_flag" described above As (S1260), one or more fourth syntax elements that are provided after the third syntax element from the coded video bitstream can be obtained when the third value of the third syntax element indicates that the mode for generating the predictor of the current block is the MMVD mode. In some embodiments, the one or more fourth syntax elements indicate the motion vector difference information for the MMVD mode. In some embodiments, the one or more fourth syntax elements correspond to one or more of "base_mv_idx," "distance_idx," and "direction_idx" described above. In some embodiments, information carried by "base_mv_idx" can be signaled by "merge_idx," and "base_mv_idx" can be omitted.

After (S1255) or (S1260), the process proceeds to (S1270), followed by (S1280) and to (S1299) and terminates.

Figure 13:
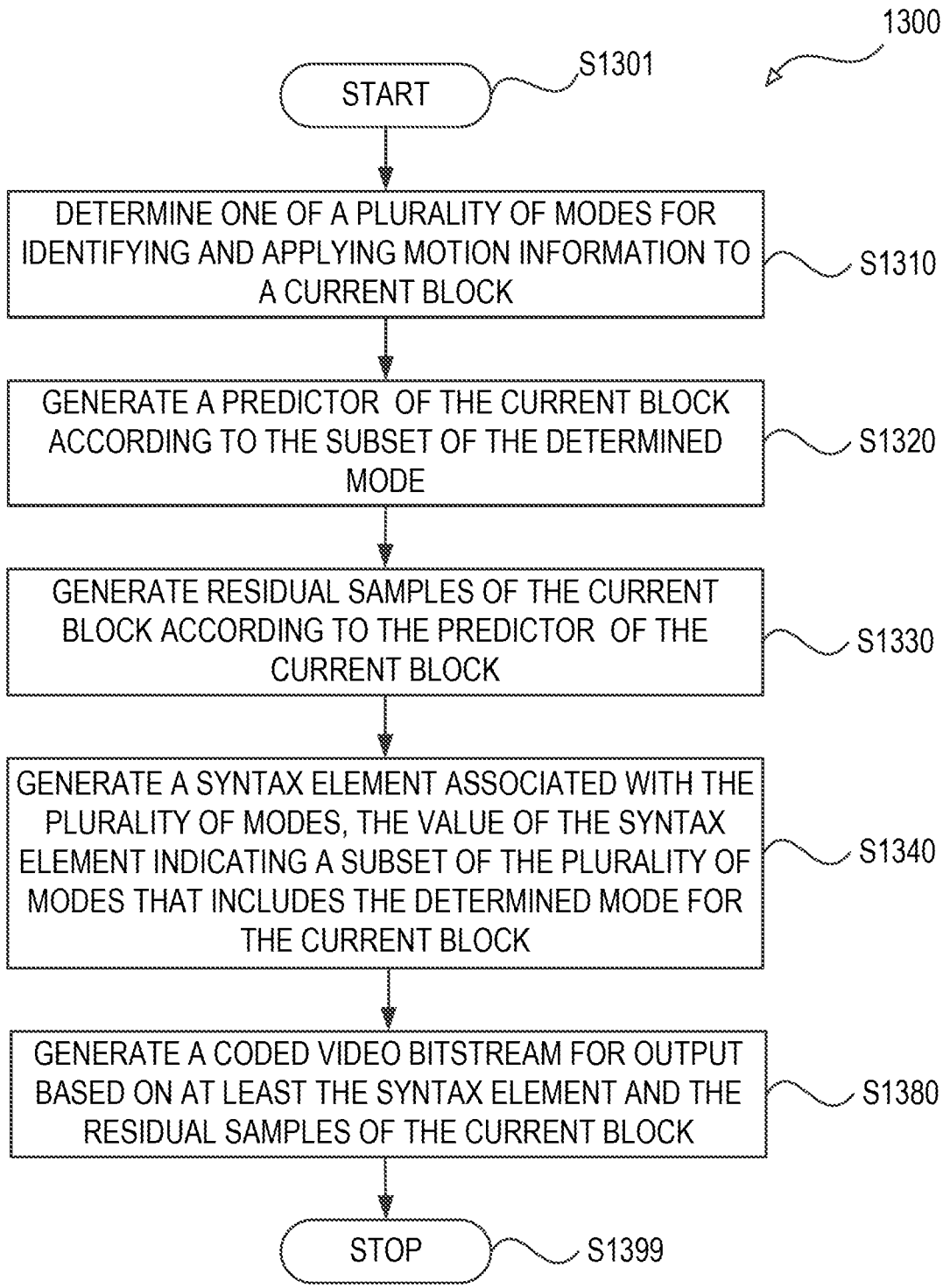
FIG. 13 shows a flow chart outlining an encoding process (1300) according to an embodiment of the disclosure.

FIG. 13 shows a flow chart outlining an encoding process (1300) according to an embodiment of the disclosure. The process (1300) can be used to encode a block (i.e., a current block) of a picture coded according to one of a plurality of modes for identifying and applying motion information to the current block. In some embodiments, one or more operations are performed before or after process (1300), and some of the operations illustrated in FIG. 13 may be reordered or omitted.

In various embodiments, the process (1300) is executed by processing circuitry, such as the processing circuitry in the terminal devices (210), (220), (230), and (240), the processing circuitry that performs functions of the video encoder (303), (503), or (603), and the like. In some embodiments, the process (1300) is implemented by software instructions, thus when the processing circuitry executes the software instructions, the processing circuitry performs the process (1300). The process starts at (S1301) and proceeds to (S1310).

At (S1310), one of a plurality of modes for identifying and applying motion information to a current block is determined as an applicable mode for the current block.

In some embodiments, the plurality of modes includes a regular merge mode corresponding to deriving motion information for the current block according to a selected motion information candidate from a list of motion information candidates, a sub-block merge prediction mode corresponding to splitting the current block into plural rectangular sub-blocks and deriving respective motion information for the plural rectangular sub-blocks, and a triangle prediction unit mode corresponding to splitting the current block into triangular sub-partitions and deriving respective motion information for the triangular sub-partitions. In some embodiments, the plurality of modes further includes an MMVD mode corresponding to deriving the motion information for the current block according to the selected motion information candidate from the list of motion information candidates and motion vector difference information. In some embodiments, the plurality of modes further includes an MHIntra mode corresponding to generating a final predictor for the current block by combining an intra predictor and an inter predictor.

At (S1320), a predictor of the current block is generated according to the determined applicable mode from (S1310). At (S1330), residual samples of the current block are generated according to the predictor. In some embodiments, the residual samples correspond to a difference between original samples of the current block and the predictor.

As (S1340), a syntax element associated with the plurality of modes is generated. A value of the syntax element indicates a subset of the plurality of modes that include the determined mode for the current block. In some embodiments, the first syntax element corresponds to syntax element "merge_list_idc" described above.

In one example, the value of the syntax element can indicate whether the motion information of the current block is to be signaled according to the regular merge mode. In one example, the value of the syntax element can indicate that the motion information of the current block is to be signaled according to the regular merge mode or the MMVD mode. In one example, the value of the syntax element can indicate that the motion information of the current block is to be signaled according to the sub-block merge prediction mode, the triangle prediction unit mode, or the MHIntra mode.

In some embodiments, the syntax element is set to one of different bins that represent respective ones of the plurality of modes. The plurality of can be arranged according to a predetermined order consistent with an order of decreasing usage frequency of the modes. In some examples, the order can be arranged consistent, in whole or in part, with any one of the examples illustrated in Tables II-V. In some embodiments, for any two modes of the plurality of modes, a code length for coding one of the two modes that is arranged in front of the other one of the two modes in the order is not greater than a code length for coding the other one of the two modes. For example, an order of the regular merge mode, the MMVD mode, the sub-block merge prediction mode, the MHIntra mode, and the triangle prediction unit mode, as illustrated in Table II.

In some embodiments, a most-frequently used mode of the plurality of modes in a picture that includes the current block is arranged first in the order and represented by a bin of the bins that has a least number of bits. In at least one example, the most-frequently used mode is the regular merge mode.

In some embodiments, one or more additional flags, such as flags mmvd_flag, sub_block_flag, MHIntra_flag, and merge_triangle_flag, can be conditionally signaled for, together with the syntax element, indicating the determined applicable mode.

At (S1380), a coded video bitstream for output can be generated based on at least the syntax element form (S1340) and the residual samples of the current block from (S1330).

After (S1330), the process proceeds to (S1399) and terminates.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
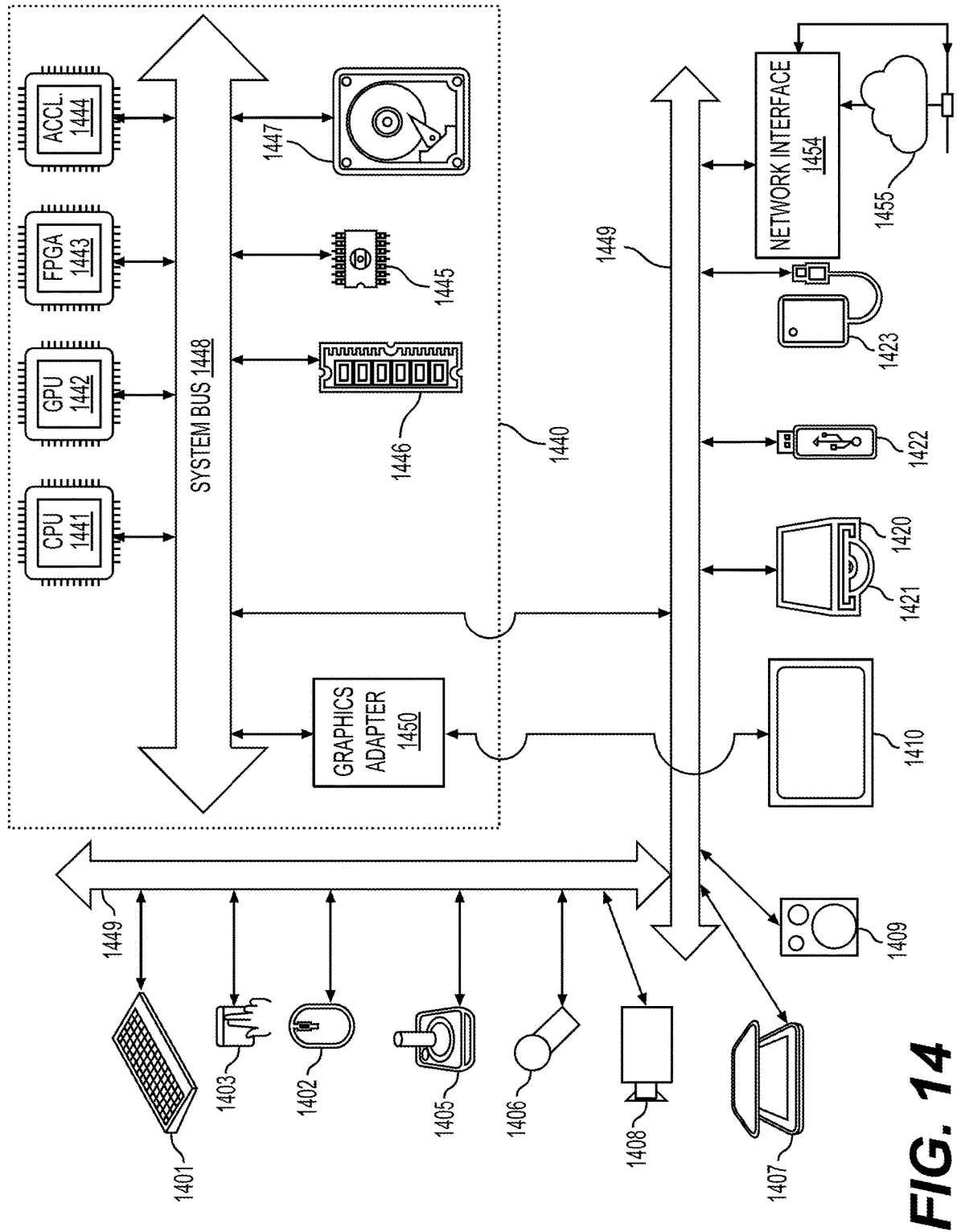
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
obtaining a first syntax element from a coded video bitstream, the first syntax element being associated with a plurality of modes for identifying and applying motion information to a current block, and a first value of the first syntax element indicating a subset of the plurality of modes for the current block;
generating a predictor of the current block according to the subset of the plurality of modes indicated by the first value of the first syntax element; and
generating reconstructed samples of the current block based on the predictor, wherein
the first syntax element is set to one of different bins that represent respective ones of the plurality of modes, and a most-frequently used mode of the plurality of modes in a picture that includes the current block is represented by a bin of the bins that has a least number of bits.

2. The method of claim 1, wherein the plurality of modes includes:
a regular merge mode corresponding to deriving motion information for the current block according to a selected motion information candidate from a list of motion information candidates;
a sub-block merge prediction mode corresponding to splitting the current block into plural rectangular sub-blocks and deriving respective motion information for the plural rectangular sub-blocks; and
a triangle prediction unit mode corresponding to splitting the current block into triangular sub-partitions and deriving respective motion information for the triangular sub-partitions.

3. The method of claim 2, wherein the plurality of modes further includes:
a merge with motion vector difference mode corresponding to deriving the motion information for the current block according to the selected motion information candidate from the list of motion information candidates and motion vector difference information.

4. The method of claim 3, wherein the plurality of modes further includes:
a multi-hypothesis prediction for intra mode corresponding to generating a final predictor for the current block by combining an intra predictor and an inter predictor.

5. The method of claim 4, wherein
the bins representing the plurality of modes are arranged, according to an order of decreasing usage frequency of the modes, as the regular merge mode, the merge with motion vector difference mode, the sub-block merge prediction mode, the multi-hypothesis prediction for intra mode, and the triangle prediction unit mode.

6. The method of claim 1, wherein
the bins representing the plurality of modes are arranged according to an order of decreasing usage frequency of the modes.

7. The method of claim 1, wherein
the most-frequently used mode is a regular merge mode corresponding to deriving motion information for the current block according to a selected motion information candidate from a list of motion information candidates.

8. The method of claim 1, further comprising:
obtaining a second syntax element that is provided after the first syntax element from the coded video bitstream, a second value of the second syntax element indicating an index for selecting a motion information candidate from a list of motion information candidates,
when the subset of the plurality of modes indicated by the first value of the first syntax element corresponding to a mode corresponding to deriving motion information for an entirety of the current block according to the selected motion information candidate, obtaining a third syntax element from the coded video bitstream when the index indicated by the second value of the second syntax element is smaller than a maximum number of motion information candidates for a merge with motion vector difference mode, a third value of the third syntax element indicating whether to generate the predictor of the current block according to:
(i) a regular merge mode corresponding to deriving motion information for the current block according to a selected motion information candidate from a list of motion information candidates, or (ii) the merge with motion vector difference mode corresponding to deriving the motion information for the current block according to the selected motion information candidate from the list of motion information candidates and motion vector difference information.

9. The method of claim 8, further comprising:
obtaining one or more fourth syntax elements that are provided after the third syntax element from the coded video bitstream when the third value of the third syntax element indicates that the mode for generating the predictor of the current block is the merge with motion vector difference mode, the one or more fourth syntax elements indicating the motion vector difference information.

10. The method of claim 1, wherein
the first value of the first syntax element indicates whether the mode to be used to generate the predictor of the current block is a block based merge mode or a sub-block based merge mode,
when the first value of the first syntax element indicates that the mode to be used to generate the predictor of the current block is the block based merge mode, the subset of the plurality of modes includes at least one of
a regular merge mode corresponding to deriving motion information for the current block according to a selected motion information candidate from a list of motion information candidates, and
a merge with motion vector difference mode corresponding to deriving the motion information for the current block according to the selected motion information candidate from the list of motion information candidates and motion vector difference information, and
when the first value of the first syntax element indicates that the mode to be used to generate the predictor of the current block is the sub-block based merge mode, the subset of the plurality of modes includes at least one of
a sub-block merge prediction mode corresponding to splitting the current block into plural rectangular sub-blocks and deriving respective motion information for the plural rectangular sub-blocks,
a triangle prediction unit mode corresponding to splitting the current block into triangular sub-partitions and deriving respective motion information for the triangular sub-partitions, and
a multi-hypothesis prediction for intra mode corresponding to generating a final predictor for the current block by combining an intra predictor and an inter predictor.

11. The method of claim 10, further comprising:
obtaining a second syntax element that is provided after the first syntax element from the coded video bitstream, a second value of the second syntax element indicating an index for selecting the motion information candidate from the list of motion information candidates,
when the first value of the first syntax element indicates that the mode to be used to generate the predictor of the current block is the block based merge mode, obtaining a third syntax element from the coded video bitstream when the index indicated by the second value of the second syntax element is smaller than a maximum number of motion information candidates for the merge with motion vector difference mode, a third value of the third syntax element indicating whether to generate the predictor of the current block according to the regular merge mode or the merge with motion vector difference mode.

12. The method of claim 10, further comprising:
obtaining one or more fourth syntax elements from the coded video bitstream that are provided after the third syntax element when the third syntax element indicates that the mode for generating the predictor of the current block is the merge with motion vector difference mode, the one or more fourth syntax elements indicating the motion vector difference information.

13. The method of claim 1, further comprising:
obtaining another syntax element that is provided after the first syntax element from the coded video bitstream, a value of the other syntax element indicating whether the mode for generating the predictor of the current block is a regular merge mode corresponding to deriving motion information for the current block according to a selected motion information candidate from a list of motion information candidates, when the first value of the first syntax element indicates that the subset of the plurality of modes includes at least the regular merge mode.

14. An apparatus, comprising:
processing circuitry configured to:
obtain a first syntax element from a coded video bitstream, the first syntax element being associated with a plurality of modes for identifying and applying motion information to a current block, and a first value of the first syntax element indicating a subset of the plurality of modes for the current block;
generate a predictor of the current block according to the subset of the plurality of modes indicated by the first value of the first syntax element; and
generate reconstructed samples of the current block based on the predictor,
wherein
the first syntax element is set to one of different bins that represent respective ones of the plurality of modes, and
a most-frequently used mode of the plurality of modes in a picture that includes the current block is represented by a bin of the bins that has a least number of bits.

15. The apparatus of claim 14, wherein the plurality of modes includes:
a regular merge mode corresponding to deriving motion information for the current block according to a selected motion information candidate from a list of motion information candidates;
a sub-block merge prediction mode corresponding to splitting the current block into plural rectangular sub-blocks and deriving respective motion information for the plural rectangular sub-blocks; and
a triangle prediction unit mode corresponding to splitting the current block into triangular sub-partitions and deriving respective motion information for the triangular sub-partitions.

16. The apparatus of claim 15, wherein the plurality of modes further includes:
a merge with motion vector difference mode corresponding to deriving the motion information for the current block according to the selected motion information candidate from the list of motion information candidates and motion vector difference information.

17. The apparatus of claim 16, wherein the plurality of modes further includes:
a multi-hypothesis prediction for intra mode corresponding to generating a final predictor for the current block by combining an intra predictor and an inter predictor.

18. The apparatus of claim 17, wherein
the bins representing the plurality of modes are arranged, according to an order of decreasing usage frequency of the modes, as the regular merge mode, the merge with motion vector difference mode, the sub-block merge prediction mode, the multi-hypothesis prediction for intra mode, and the triangle prediction unit mode.

19. A non-transitory computer-readable medium storing instructions which when executed by a computer for video decoding causes the computer to perform:
obtaining a first syntax element from a coded video bitstream, the first syntax element being associated with a plurality of modes for identifying and applying motion information to a current block, and a first value of the first syntax element indicating a subset of the plurality of modes for the current block;
generating a predictor of the current block according to the subset of the plurality of modes indicated by the first value of the first syntax element; and
generating reconstructed samples of the current block based on the predictor, wherein
the first syntax element is set to one of different bins that represent respective ones of the plurality of modes, and
a most-frequently used mode of the plurality of modes in a picture that includes the current block is represented by a bin of the bins that has a least number of bits.

* * * * *